(12) United States Patent
Kitazawa et al.

(10) Patent No.: US 8,395,973 B2
(45) Date of Patent: Mar. 12, 2013

(54) WAVEGUIDE, RECORDING HEAD, AND RECORDING DEVICE

(75) Inventors: Tazuko Kitazawa, Osaka (JP); Noboru Iwata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 259 days.

(21) Appl. No.: 12/923,355

(22) Filed: Sep. 16, 2010

(65) Prior Publication Data
US 2011/0085425 A1    Apr. 14, 2011

(30) Foreign Application Priority Data

Oct. 8, 2009  (JP) ................................. 2009-234344
Jun. 14, 2010 (JP) ................................. 2010-135372

(51) Int. Cl.
*G11B 11/00* (2006.01)
(52) U.S. Cl. .................................................... 369/13.03
(58) Field of Classification Search ........................ None
See application file for complete search history.

(56) References Cited

U.S. PATENT DOCUMENTS

| | | | |
|---|---|---|---|
| 7,440,660 B1 | 10/2008 | Jin et al. | |
| 2006/0075417 A1 | 4/2006 | Miyanishi et al. | |
| 2007/0041119 A1 | 2/2007 | Matsumoto et al. | |
| 2009/0106783 A1 | 4/2009 | Miyanishi et al. | |
| 2009/0168220 A1 | 7/2009 | Komura et al. | |
| 2009/0310459 A1* | 12/2009 | Gage et al. ..................... | 369/100 |
| 2010/0061199 A1 | 3/2010 | Hirara et al. | |
| 2010/0074063 A1* | 3/2010 | Peng et al. ................. | 369/13.32 |
| 2010/0328807 A1* | 12/2010 | Snyder et al. .................... | 360/59 |

FOREIGN PATENT DOCUMENTS

| | | |
|---|---|---|
| JP | 2005-004901 A | 1/2005 |
| JP | 2006-120294 A | 5/2006 |
| JP | 2006-351091 A | 12/2006 |
| JP | 4081480 B2 | 4/2008 |
| JP | 2008-152897 A | 7/2008 |
| JP | 2009-37661 A | 2/2009 |
| JP | 2009-099255 A | 5/2009 |
| JP | 2009-163806 A | 7/2009 |
| JP | 2009-193644 A | 8/2009 |

OTHER PUBLICATIONS

"Numerical analysis of coupled wedge plasmons in a structure of two metal wedges separated by a gap" D.F. Pile et al., J. App. Phys. 100, 013101 (2006).
New Plasmon Waveguides Composed of Twin Metal Wedges with a Nano Gap Masanobu Haraguchi et al., Optical Review 13, 228 (2006).
"Japanese Journal of Applied Physics" vol. 43, No. 11A, 2004, pp. 7483-7488.
D.K. Gramotnev, "Adiabatic nanofocusing of plasmons by sharp metallic grooves: Geometrical optics approach", J. App. Phys., 98, (2005) 104302, pp. 1-11.

* cited by examiner

*Primary Examiner* — Joseph Haley
*Assistant Examiner* — Henok Heyi
(74) *Attorney, Agent, or Firm* — Edwards Wildman Palmer LLP; David G. Conlin; David A. Tucker

(57) ABSTRACT

Incident light can be efficiently converted into near-field light whose spot size is small. A waveguide 10 includes: a metallic member 11 made of a metallic material; and a dielectric member 12 made of a dielectric material. The metallic member 11 includes a first interface 16 and a second interface 18 so as to sandwich the dielectric member 12. The first interface and the second interface are provided so that an inter-interface distance therebetween may decrease from ends 16c and 18c to ends 16d and 18d. The first interface 16 and the second interface 18 have flections P16 and P18, respectively.

17 Claims, 23 Drawing Sheets

300nm

WAVEGUIDE, RECORDING HEAD, AND RECORDING DEVICE

This Nonprovisional application claims priority under 35 U.S.C. §119(a) on Patent Application No. 2009-234344 filed in Japan on Oct. 8, 2009 and Patent Application No. 2010-135372 filed in Japan on Jun. 14, 2010, the entire contents of which are hereby incorporated by reference.

TECHNICAL FIELD

The present invention relates to a waveguide, a recording head, and a recording device.

BACKGROUND ART

Recently, waveguides are vigorously developed which convert propagating light into near-field light. Application of the waveguides is actively proposed not only for an optical interconnection of an optical circuit but also for a recording head and a recording device. In the field of optical recording, miniaturization of an optical spot is advanced for a higher recording density. In view of this, use of near-field light is proposed. In the use of near-field light, a high intensity of near-field light is required for a high S/N ratio. For this reason, a waveguide is used which converts propagating light into near-field light by, particularly, a surface plasmon polariton technology.

For optically-assisted magnetic recording, it is necessary to take into consideration relative positions of a waveguide, a magnetic pole, and a reproducing element.

For example, in an optically-assisted magnetic recording head disclosed in Patent Literature 1, a constriction having a rectangular shape or a V-shape is formed in a metal film so that a position of a magnetic field generated due to an electric current passed through the metal film may be matched with a position of near-field light generated due to light which enters the constriction. In this case, a polarization direction of the incident light is a direction parallel with a longitudinal direction of the constriction.

In each of optically-assisted magnetic recording heads disclosed respectively in Patent Literatures 2 and 3, a waveguide whose cross-section is a triangle is formed, and a polarization direction is adopted which is perpendicular to that one side of the triangle which is oriented toward a main magnetic pole. This causes near-field light to localize at a position on the one side of the triangle, and generates near-field light in the vicinity of a main magnetic pole.

In an optically-assisted magnetic recording head disclosed in Patent Literature 4, a metal film having an aperture at an output terminal of a semiconductor laser so that near-field light may be generated, by the metal film, through the use of surface plasmon polariton enhancement. Patent Literature 4 exemplifies a triangle as one example of a shape of the aperture. In this case, a polarization direction of incident light is a direction perpendicular to one side of the triangle.

In each case, light incident on the metal film is converted into surface plasmon polaritons which are a kind of near-field light. The surface plasmon polaritons propagate along a tip of the constriction and one side of the triangle, thereby reaching the exit surface.

Non-patent Literature 1 teaches that in a case where light polarized in a width direction of a V-shape of a V-shaped waveguide enters the V-shaped waveguide, generated surface plasmon polaritons converge at a tip of the V-shape.

The following describes this, with reference to (a) through (d) of FIG. 15. (a) of FIG. 15 is a perspective view illustrating an arrangement of the waveguide disclosed in Non-patent Literature 1. (b) of FIG. 15 is a cross-sectional view illustrating the waveguide in (a) of FIG. 15 which cross-sectional view is parallel with an X-Y plane. (c) of FIG. 15 is a cross-sectional view illustrating the waveguide in (a) of FIG. 15 which cross-sectional view is parallel with a Y-Z plane and in which propagation of surface plasmon polaritons is illustrated. (d) of FIG. 15 is a diagram illustrating the propagation illustrated in (c) of FIG. 15.

As illustrated in (a) of FIG. 15, X, Y, and Z axes are assumed. A waveguide 100 consists of a metallic member 101 and a dielectric member 102. The metallic member 101 has a groove whose cross-section parallel with an X-Y plane is a V-shape. The dielectric member 102 is provided in the groove.

As illustrated in (b) of FIG. 15, a width, in a direction of an X-axis, of the groove formed in the metallic member 101 (i.e., a width of the dielectric member 102) becomes narrower from a plus direction of a Y-axis to a minus direction of the Y-axis. The narrower the width in the direction of the X-axis, the larger the effective refractive index for surface plasmon polaritons excited in a case where light polarized in the direction of the X-axis enters the waveguide 100. In this case, a track of the surface plasmon polaritons propagating through the groove in the metallic member 101 is indicated by an arrow A in (c) of FIG. 15. That is, the surface plasmon polaritons change their propagation direction toward a tip of the groove.

If incident light travels from a medium having a small refractive index to a medium having a large refractive index, $\theta 4 < \theta 3$ is satisfied by Snell's law, as illustrated in (d) of FIG. 15. Since a groove of a V-shaped waveguide such as the waveguide 100 is considered to be a group of layers in which a refractive index gradually changes, the surface plasmon polaritons propagating through the groove in the metallic member 101 converge at the tip of the V-shape of the groove.

As indicated by a dashed line in (d) of FIG. 15, usually, light (surface plasmon polaritons) is reflected on an interface between two media which are different in refractive index from each other. However, if a difference between respective refractive indexes of the two media is very small, a reflectance is very small. That is, decreasing an angle of an opening of the V-shape of the groove makes it possible to decrease a change in effective refractive index. As a result, reflection of the light can be suppressed in the V-shaped waveguide 100 so that the surface plasmon polaritons may be converged at a Z-axis (i.e., at the edge of the groove).

CITATION LIST

Patent Literature 1

Japanese Patent Application Publication, Tokukai, No. 2006-120294 A (Publication Date: May 11, 2006)

Patent Literature 2

Japanese Patent Application Publication, Tokukai, No. 2008-152897 A (Publication Date: Jul. 3, 2008)

Patent Literature 3

Japanese Patent Application Publication, Tokukai, No. 2009-37661 A (Publication Date: Feb. 19, 2009)

Patent Literature 4

Japanese Patent Application Publication, Tokukai, No. 2006-351091 A (Publication Date: Dec. 28, 2006)

Non-Patent Literature 1

"Adiabatic nanofocusing of plasmons by sharp metallic grooves: Geometrical optics approach," D. K. Gramotnev, J. App. Phys. 98, 104302 (2005)

SUMMARY OF INVENTION

Technical Problem

However, a technique such as disclosed in Patent Literature 1 is different from a technique such as disclosed in Non-patent Literature 1. Specifically, the former technique is for emitting, into the constriction, light polarized in a direction parallel with the longitudinal direction of the constriction. By contrast, the latter technique is for converging surface plasmon polaritons at a tip of the V-shape. It follows that light with which the constriction of the Patent Literature 1 except its tip is not used. In addition, light emitted not toward the tip of the constriction of Patent Literature 1 does not contribute to the near-field light to be generated at the tip. This leads to a problem in that a sufficient efficiency cannot be obtained in a case where, e.g., the metal film is formed adjacently to an exit aperture of a semiconductor laser, and the metal film is irradiated with a diverging light.

Another problem is that an intensity of surface plasmon polaritons reaching the exit surface is further weakened with the film thickness of the metal film of the order of several hundreds nanometers, due to problems of adherence and heat resistance of the metal film.

Further, in a case where the metal film is formed adjacently to the exit aperture of a semiconductor laser, and a TM-polarized semiconductor laser is used, heat is likely to accumulate in the vicinity of the semiconductor laser since the TM-polarized semiconductor laser has a higher threshold than the TE-polarized semiconductor laser. In addition, since an upper limit of emission power of the TM-polarized semiconductor laser is low, an upper limit of an intensity of the near-field light generated on the metal film is also low. On the other hand, in a case where light polarized in a direction parallel with the longitudinal direction of the constriction is emitted into the constriction by the TE-polarized semiconductor laser, there is a difficulty in forming the constriction together with an electrode.

According to each of the techniques of Patent Literatures 2 through 4, near-field light is localized on one side of a triangle. Accordingly, the near-field light spot is expanded to a size of the side of the triangle. This leads to a problem of an increase in size of a recorded mark and a problem of a weak intensity due to the expansion of the near-field light spot. Another problem is that a position where the near-field light is generated is originally different from a position where the magnetic field is generated.

Further, even if the technique disclosed in Non-patent Literature 1 is employed as it is, surface plasmon polaritons are generated in accordance with a radiation angle of the laser, in a case where a waveguide is provided adjacently to the laser light source. This leads to a problem of light not converged at the tip of the V-shape. Further, in a case where a recording head is arranged such that a waveguide is provided adjacently to a laser light source, the waveguide has to be very long in order that the near-field light may be converged at the tip of the V-shape of the waveguide. This leads to a problem of a difficulty in formation of the waveguide due to a very thick film thickness of the order of several micrometers.

The present invention was made in view of the problems. An object of the present invention is to efficiently convert incident light into near-field light whose spot size is small.

Solution to Problem

In order to attain the object, a waveguide of the present invention is a waveguide for converting incident light into near-field light, including: a metallic member made of a metallic material; and a dielectric member made of a dielectric material, the metallic member sandwiching the dielectric member in such a manner that a first interface and a second interface between the metallic member and the dielectric member are disposed to have a shorter inter-interface distance therebetween toward first ends from second ends thereof, and at least one of the first interface and the second interface including a flection.

According to the arrangement, the metallic member includes the first interface and the second interface so as to sandwich the dielectric member. This makes it possible to convert, by the first interface and the second interface, light incident on the metallic member into surface plasmon polaritons.

An effective refractive index of the surface plasmon polaritons is low in an area where the inter-interface distance is long while the effective refractive index of the surface plasmon polaritons is high in an area where the inter-interface distance is short. The surface plasmon polaritons propagating along the first interface and the second interface change their propagation direction to a direction in which the effective refractive index is increased.

According to the arrangement, the first interface and the second interface are provided so that the inter-interface distance therebetween may be decreased from the first ends to the second ends. As a result, the propagation direction of the surface plasmon polaritons can be changed so that the inter-interface distance may be decreased.

The arrangement in which the first interface and the second interface are provided so that the inter-interface distance therebetween may be decreased from the first ends to the second ends makes it possible to converge more, at the second ends, the surface plasmon polaritons propagating along the first interface and second interface, as compared to a case where the first interface and the second interface are provided parallel with each other. This makes it possible to increase an intensity of near-field light which exits from the metallic member, and to reduce a spot size of the near-field light.

Further, according to the arrangement, at least one of the first interface and the second interface includes a flection. As a result, the surface plasmon polaritons propagating along the first interface or the second interface can be reflected by the flection so that the propagation direction may be changed. This makes it possible to converge more, at the second ends, the surface plasmon polaritons propagating along the first interface and the second interface, as compared to a case where neither the first interface nor the second interface includes the flection. This makes it possible to increase an intensity of the near-field light which exits from the metallic member, and to reduce the spot size. As a result, the intensity can be increased. Further, this makes it possible to reduce a thickness of a waveguide.

As described above, the arrangement makes it possible to efficiently convert incident light into near-field light whose spot size is small.

Advantageous Effects of Invention

A waveguide of the present invention includes: a metallic member made of a metallic material; and a dielectric member made of a dielectric material, the metallic member sandwiching the dielectric member in such a manner that a first interface and a second interface between the metallic member and the dielectric member are disposed to have a shorter inter-interface distance therebetween toward first ends from second ends thereof, and at least one of the first interface and the second interface including a flection.

This makes it possible to efficiently convert incident light into near-field light whose spot size is small.

Figure 15:
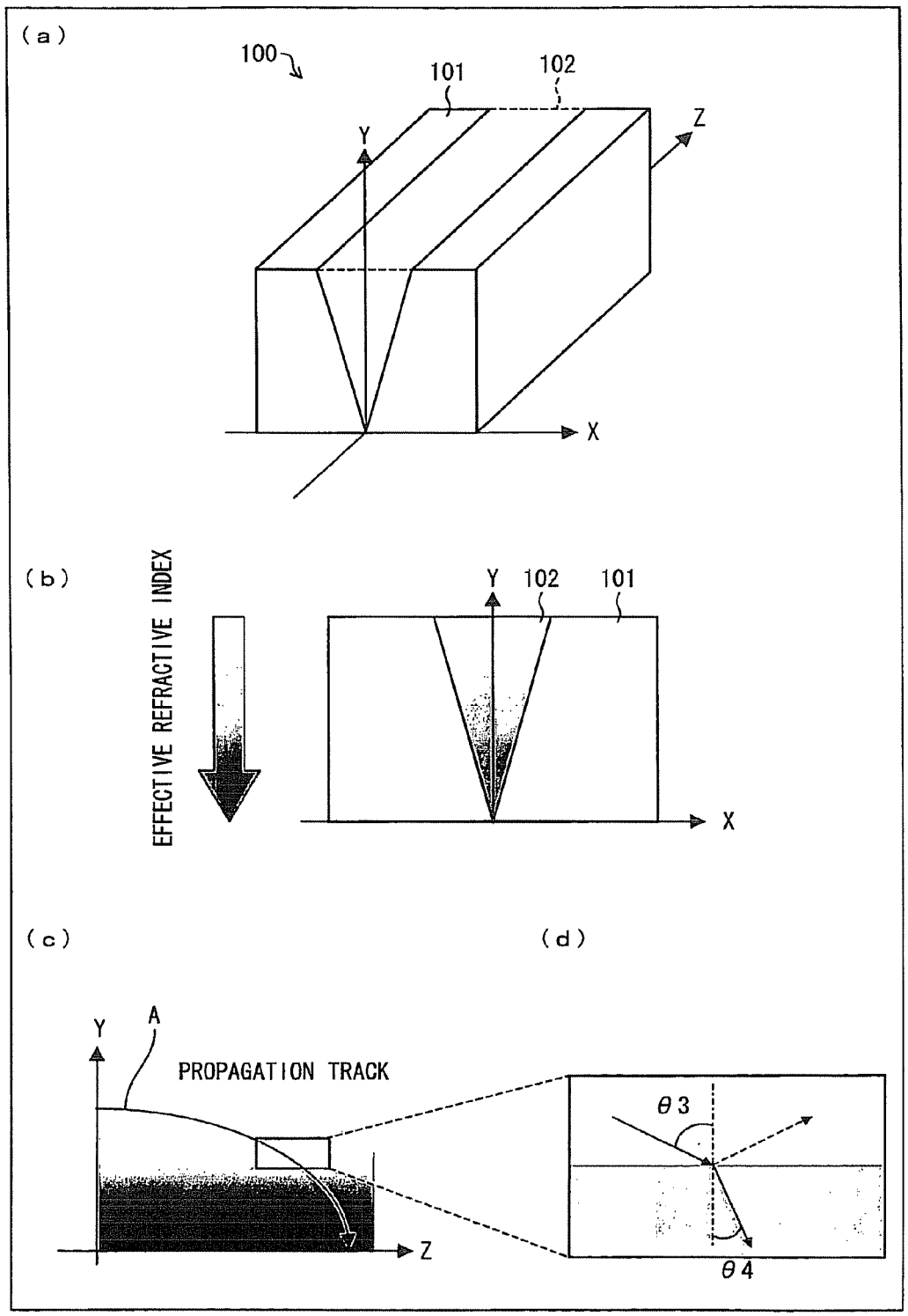

(a) of FIG. 15 is a perspective view illustrating an arrangement of a conventional waveguide. (b) of FIG. 15 is a cross-sectional view illustrating the waveguide in (a) of FIG. 15 which cross-sectional view is parallel with an X-Y plane. (c) of FIG. 15 is a cross-sectional view illustrating the waveguide in (a) of FIG. 15 which cross-sectional view is parallel with a Y-Z plane and in which propagation of surface plasmon polaritons is illustrated. (d) of FIG. 15 is a diagram illustrating the propagation illustrated in (c) of FIG. 15.

Figure 16:
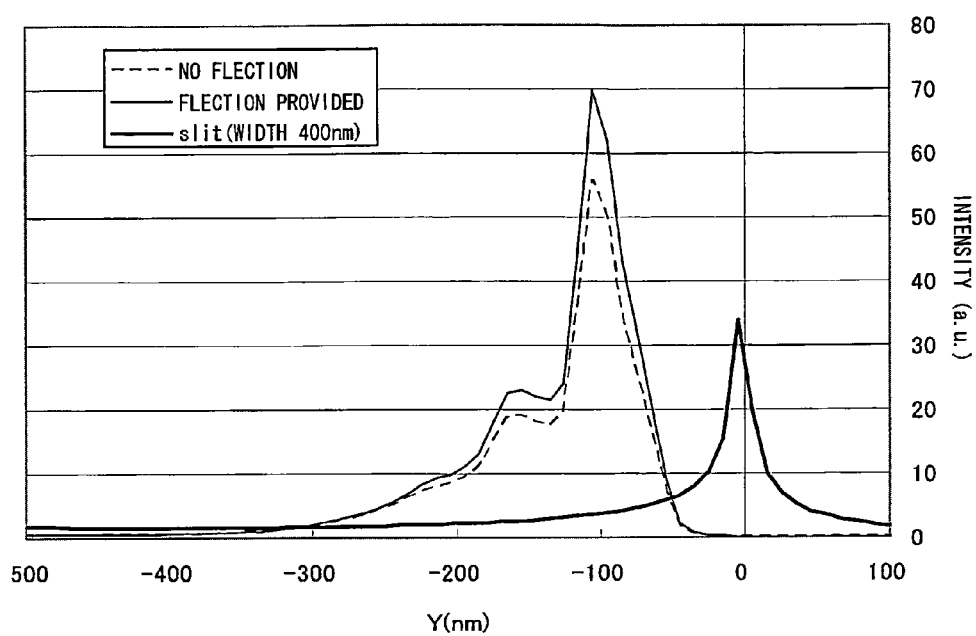

FIG. 16 is a graph showing intensities of near-field light, with respect to the Y-direction, on light exit surfaces (X-Y planes) of waveguides.

Figure 17:
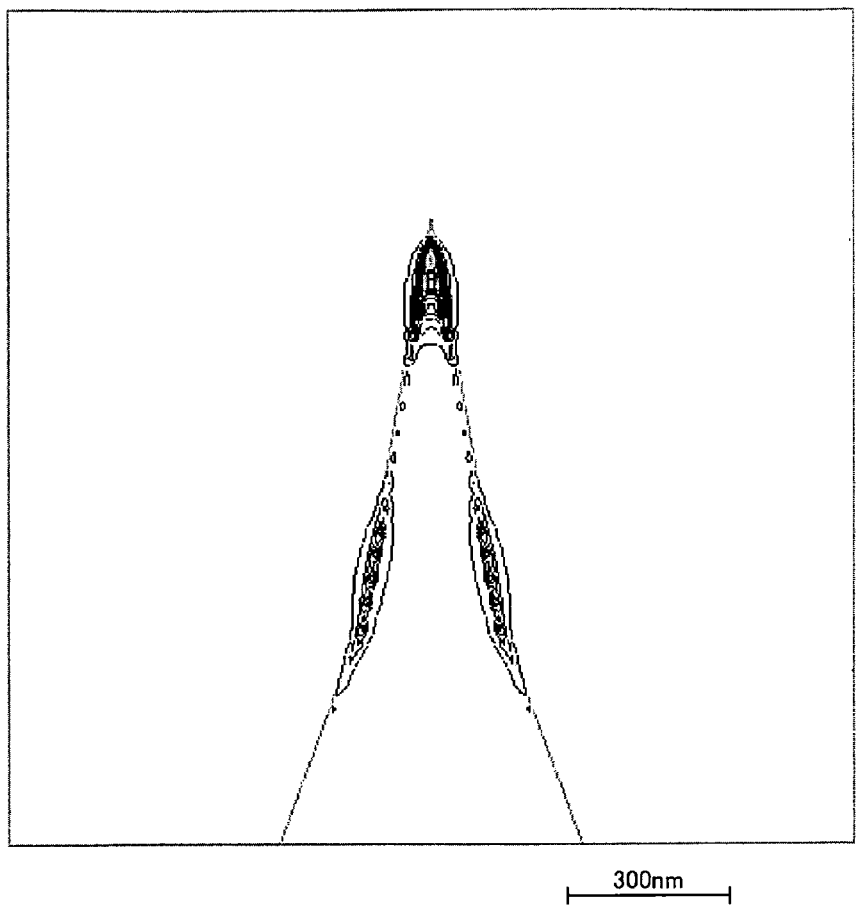

FIG. 17 is a diagram showing an intensity distribution of near-field light on the light exit surface of the waveguide of the first embodiment.

Figure 18:
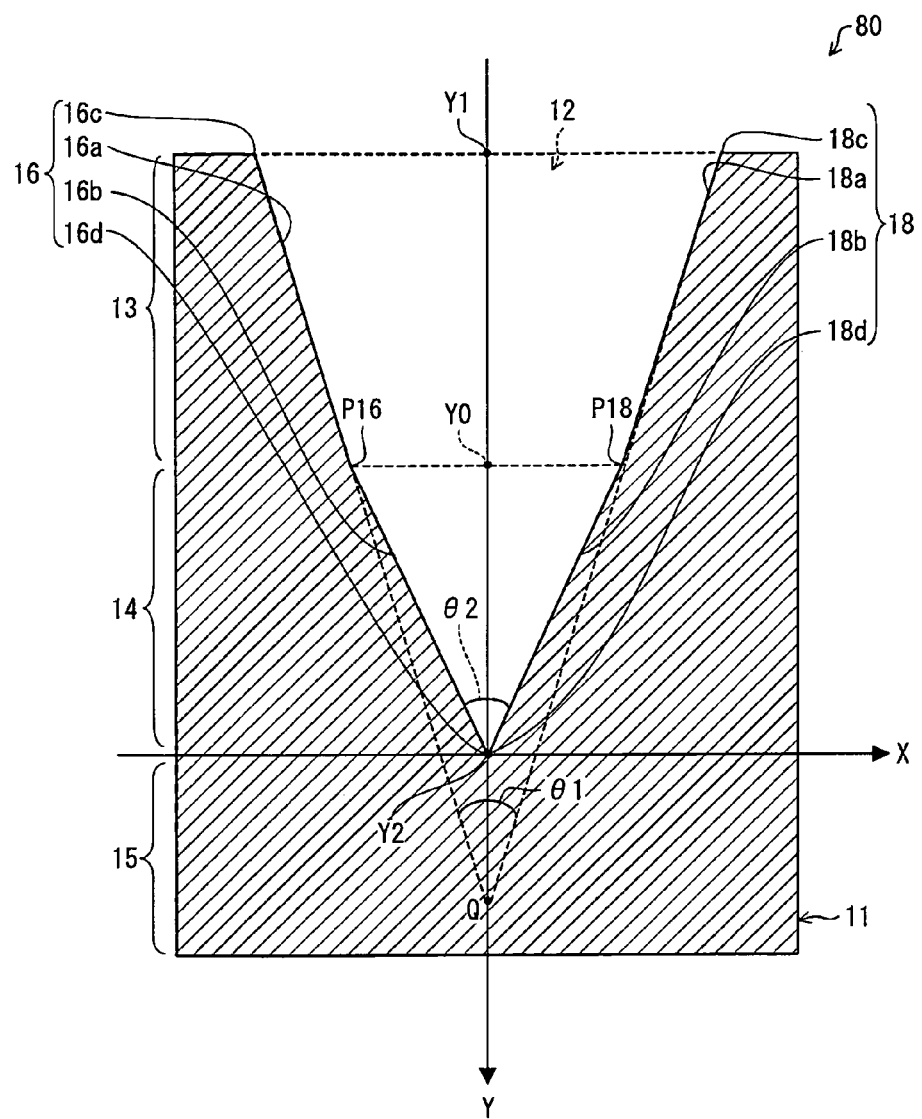

FIG. 18 is a diagram illustrating a light incident surface of a waveguide of a second embodiment of the present invention.

Figure 19:
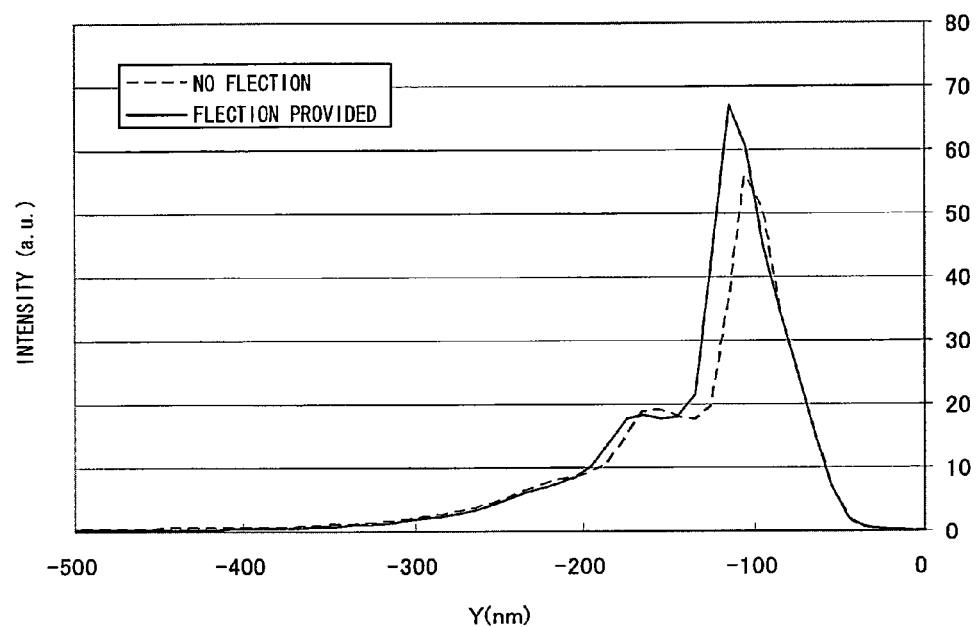

FIG. 19 is a graph showing intensity distributions, with respect to distances parallel with the Y-direction, of surface plasmon polaritons on light exit surfaces (X-Y planes) of waveguides.

Figure 20:
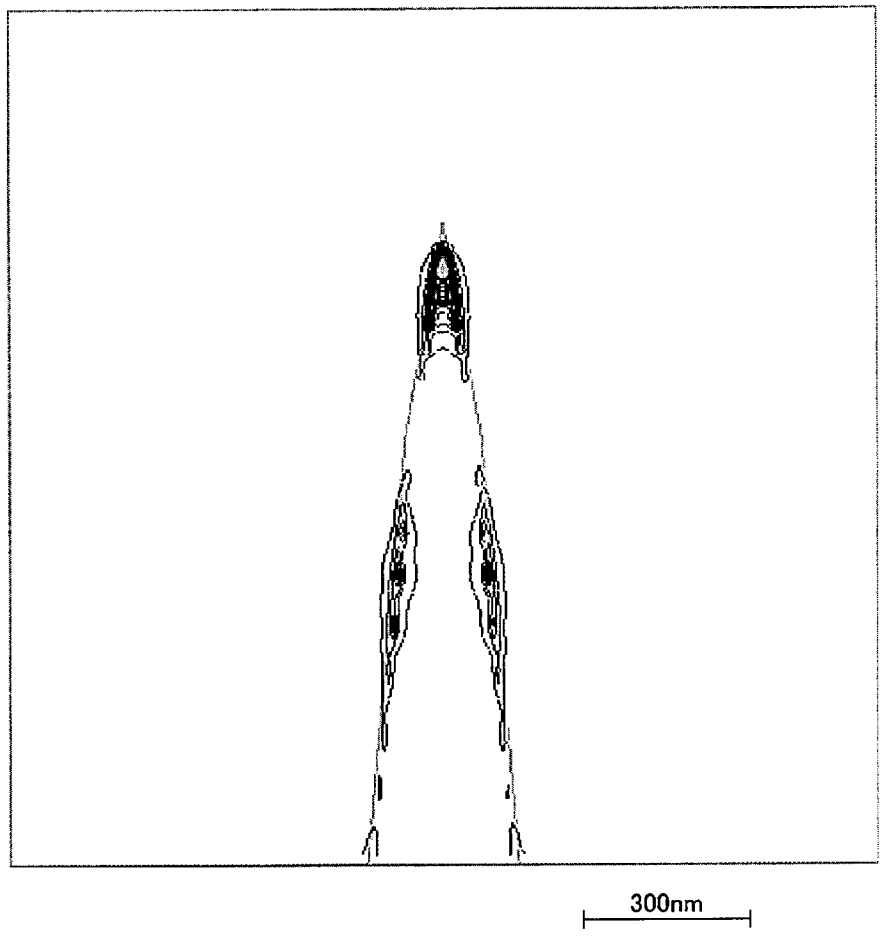

FIG. 20 is a diagram showing an intensity distribution of near-field light on the light exit surface of the waveguide of the second embodiment.

Figure 21:
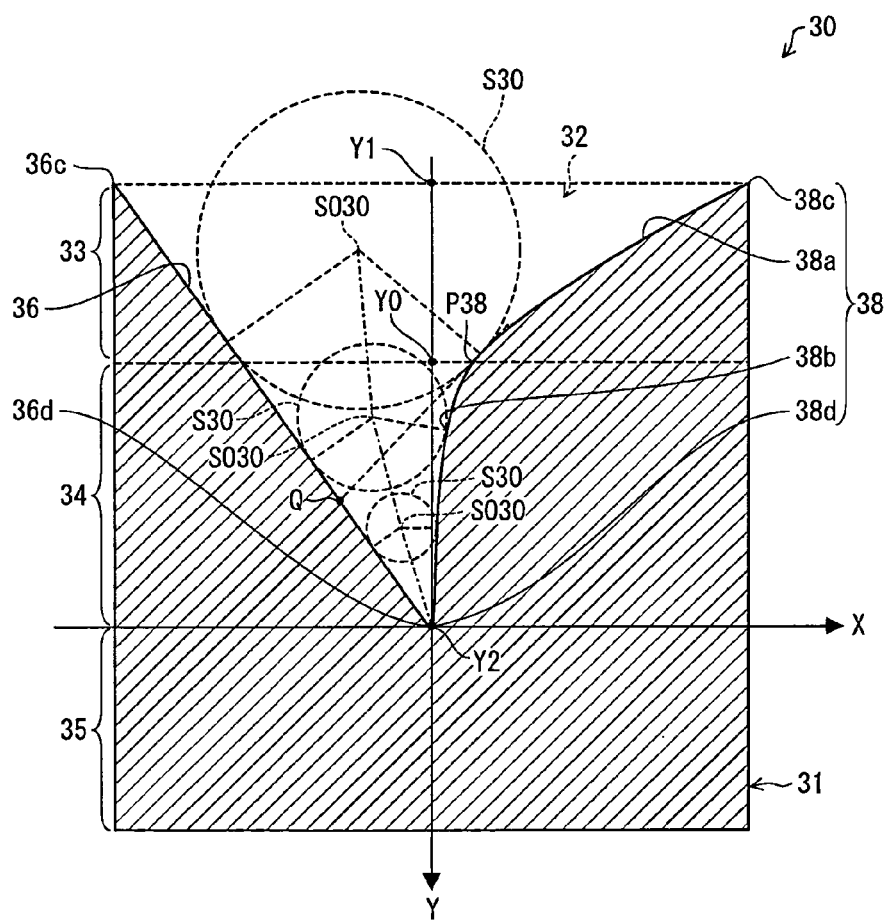

FIG. 21 is a diagram for explaining an inter-interface distance and a flection of the waveguide of the present invention.

Figure 22:
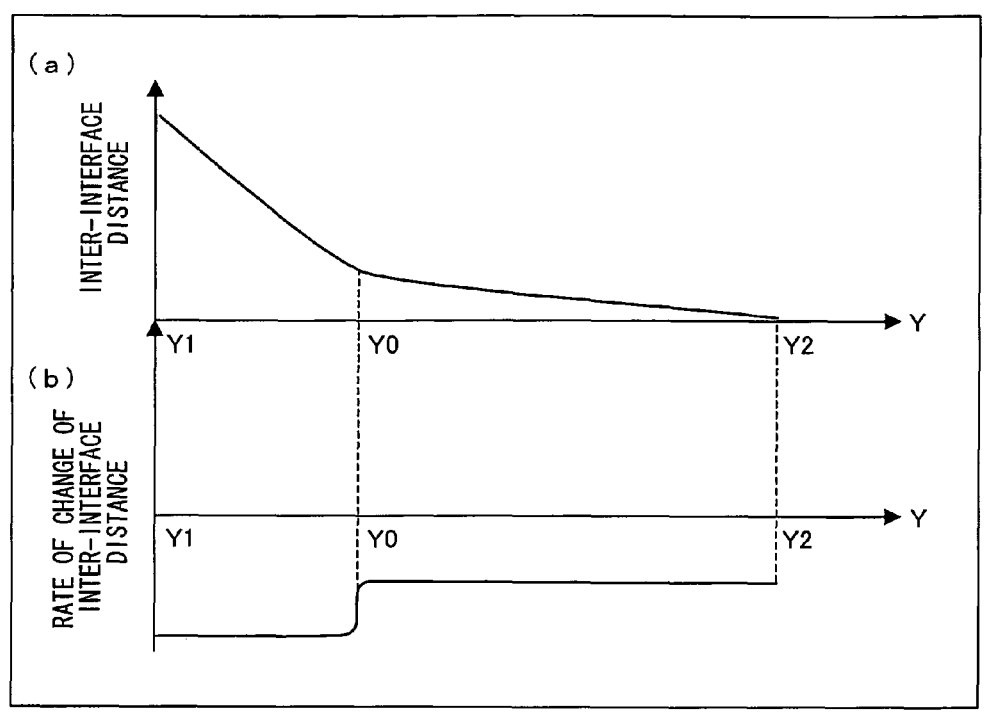

(a) of FIG. 22 is a graph showing inter-interface distances of the waveguide 30 with respect to distances parallel with a Y-axis. (b) of FIG. 22 is a graph showing rates of change of the inter-interface distances shown in (a) of FIG. 22.

Figure 23:
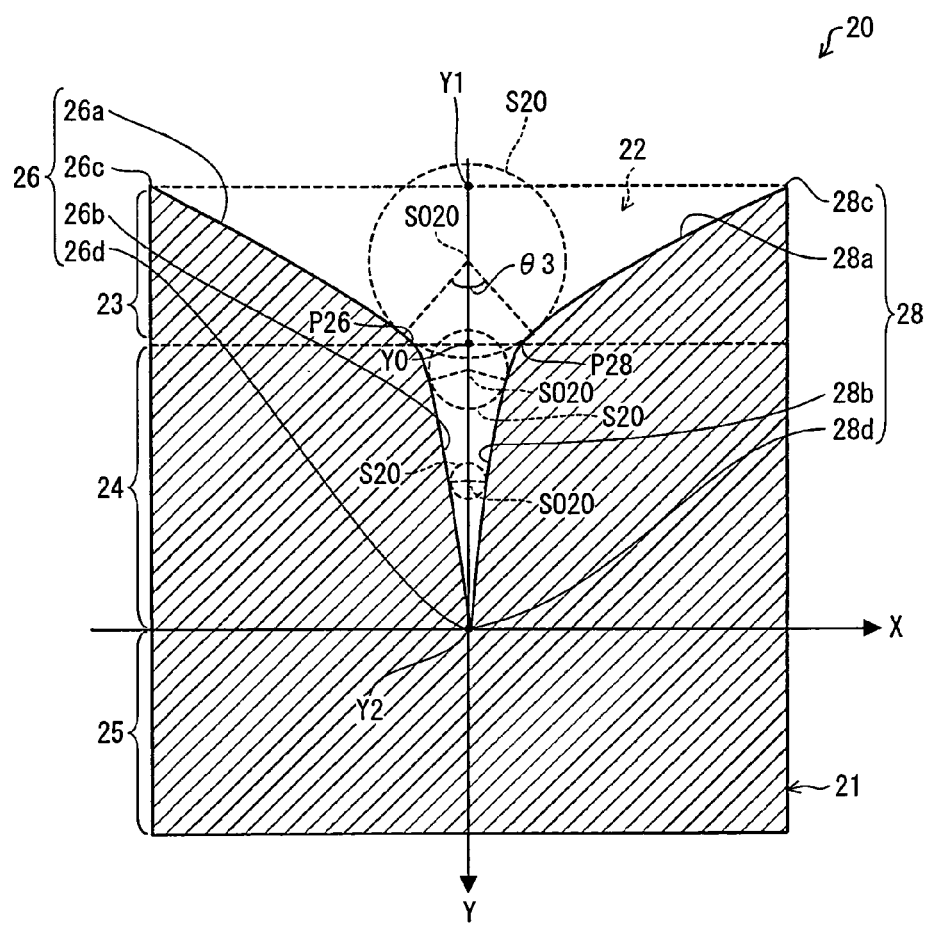

FIG. 23 is a diagram for explaining an inter-interface distance and a flection of the waveguide of the present invention.

DESCRIPTION OF EMBODIMENTS

First Embodiment

The following describes a waveguide 10 of a first embodiment of the present invention, with reference to FIGS. 1 through 14, and 16.

(Arrangement of Waveguide)

Figure 1:
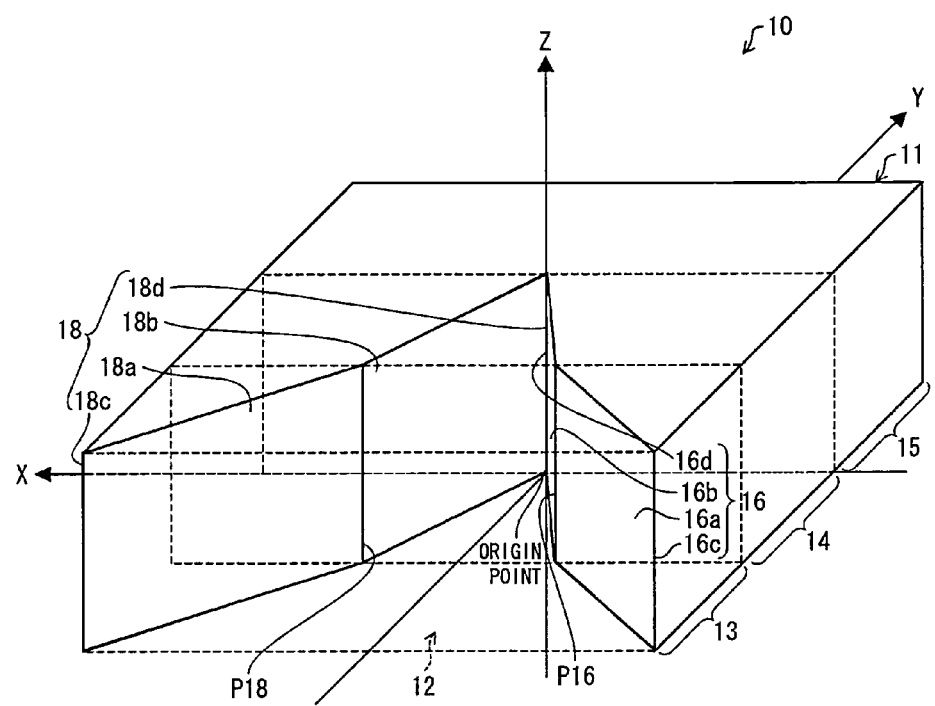
FIG. 1 is a perspective view illustrating a schematic arrangement of a waveguide of the present invention.
Figure 2:
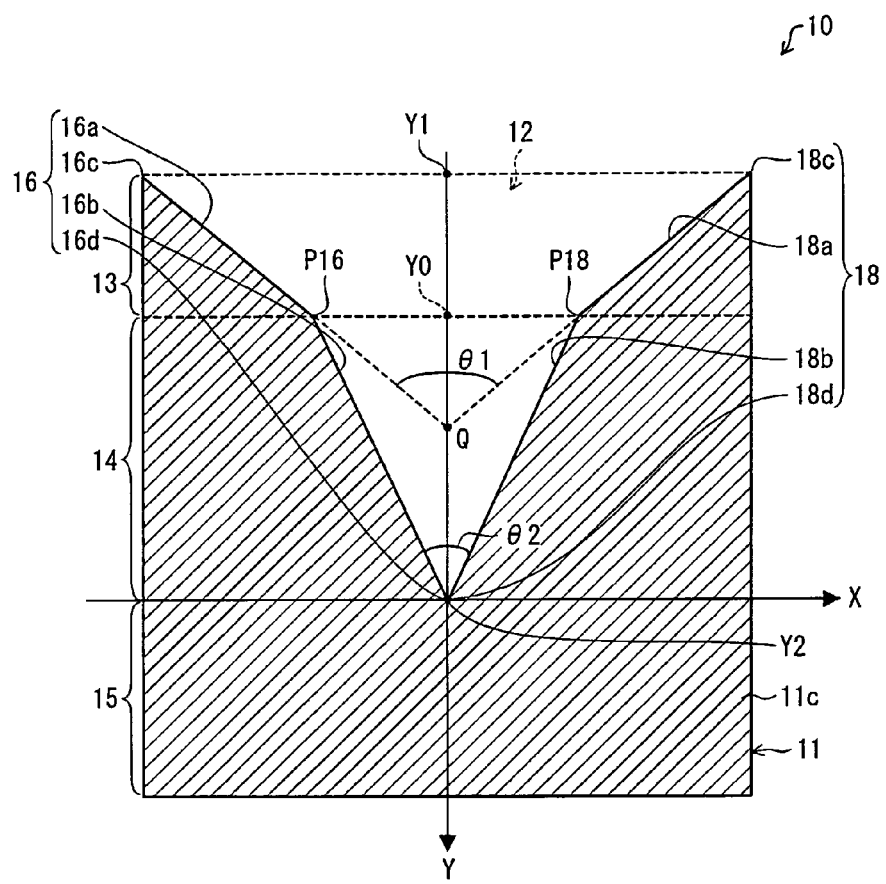
FIG. 2 is a cross-sectional view illustrating the waveguide of a first embodiment of the present invention.

First, the following describes an arrangement of the waveguide 10, with reference to FIGS. 1 and 2.

FIG. 1 is a perspective view illustrating a schematic arrangement of the waveguide 10. FIG. 2 is a diagram illustrating a light incident surface of the waveguide 10.

The waveguide 10 generates near-field light as below. Surface plasmon polaritons are excited due to light (incident light; e.g., laser) emitted from a light source toward the waveguide 10. The surface plasmon polaritons thus excited propagate through the waveguide 10, thereby generating near-field light.

The waveguide 10 includes a metallic member 11 made of a metallic material and a dielectric member 12 made of a dielectric material. That surface of the waveguide 10 toward which the light is emitted is a light incident surface. The waveguide 10 converts the incident light from a light incident surface side into surface plasmon polaritons so as to emit the surface plasmon polaritons outside the waveguide 10 from a light exit surface opposite to the incidence surface.

A metallic member material of the metallic member 11 can be any metallic member material, provided that the metallic member material strongly excites the surface plasmon polaritons, although the metallic member material depends on a wavelength of the light incident on the metallic member 11. Specifically, the metallic member material preferably contains, as its main component, one selected from the group consisting of gold, silver, copper, platinum, chrome, and aluminum.

A material of the dielectric member 12 can be any material, provided that the material allows light having a wavelength of the light source to pass through the material. Specifically, the electric body 12 can be air; an oxide such as silicon oxide, glasses, aluminum oxide, and titanium oxide; and a nitride such as aluminum nitride.

The metallic member 11 has a first interface 16 and a second interface 18 which are interfaces between the metallic member 11 and the dielectric member 12. The first interface 16 and the second interface 18 face each other so as to sandwich the dielectric member 12 therebetween so as to incline to each other.

The first interface 16 and the second interface 18 are symmetrically formed with respect to a symmetric axis. The first interface 16 includes first interfaces 16a and 16b, and a flexion P16 which is a flection formed therebetween. The first interface 16 has an end 16c (one end) and an end 16d (other end). A distance between the first interface 16 and the second interface 18 is maximal at the end 16c whereas the distance is minimal at the end 16d.

The second interface 18 includes a second interfaces 18a and 18b, and a flexion P18 which is a flection formed therebetween. The second interface 18 has an end 18c (one end) and an end 18d (other end). A distance between the second interface 18 and the first interface 16 is maximal at the end 18c whereas the distance is minimal at the end 18d.

The first interface 16 and the second interface 18 are formed so as to have a maximal distance between respective ends 16c and 18c and so that a distance between the first interface 16 and the second interface 18 gradually decreases toward respective ends 16d and 18d. The first interface 16 and the second interface 18 finally have contact with each other at the ends 16d and 18d.

That is, a rate of change of a distance between the first interface 16 and the second interface 18 changes at the flections P16 and P18. Thus, the flections P16 and P18 are formed on the first interface 16 and the second interface 18, respectively. As described below, this makes it possible to reflect, by the flections P16 and P18, surface plasmon polaritons propagating along the first interface 16 and the second interface 18. As a result, light incident on the waveguide 10 can be efficiently converted into near-field light whose spot size is small.

In the following explanation, the waveguide 10 is divided into the three areas: a first area 13, a second area 14, and a third area 15 which are adjacently provided in this order.

Each of the first area 13 and the second area 14 is an area including an area of the metallic member 11 sandwiching the dielectric member 12 and an area of the dielectric member 12 sandwiched by the metallic member 11. The first area 13 and the second area 14 are bordered (partitioned) from each other in reference to the flections P16 and P18. The third area 15 is bordered (partitioned) from the first area 13 and the second area 14 in reference to the end 16d of the first interface 16 and the end 18d of the second interface 18.

Of interfaces constituting the first interface 16, the first interface 16a is an area included in the first area 13 while the first interface 16b is an area included in the second area 14. In other words, of the interfaces constituting the first interface 16, an interface which is more distant from the second interface 18 than the flection P16 is the first interface 16a in the first area 13. Of the interfaces constituting the first interface 16, an interface which is closer to the second interface 18 than the flection P16 is the first interface 16b in the second area 14.

Of interfaces constituting the second interface 18, the second interface 18a is an area included in the first area 13 while the second interface 18b is an area included in the second area 14. In other words, of the interfaces constituting the second interface 18, an interface which is more distant from the first interface 16 than the flection P18 is the second interface 18a in the first area 13. Of the interfaces constituting the second interface 18, an interface which is closer to the first interface 16 than the flection P18 is the second interface 18b in the second area 14.

The third area 15 is an area which does not include the dielectric member 12 but consists of only a part of the metallic member 11. The third area 15 is an area which connects those areas of the metallic member 11 which sandwich the dielectric member 12.

The following description assumes an X-axis, a Y-axis, and a Z-axis, as illustrated in FIG. 1 etc. That is, a point where the X-axis, the Y-axis, and the Z-axis orthogonally cross each other is an origin point, and the Z-axis includes the respective ends 16d and 18d of the first interface 16 and the second interface 18. That is, the ends 16d and 18d lie at the origin point in a cross-section parallel with an X-Y plane of the waveguide 10. A direction of a distance between the first interface 16 and the second interface 18 (i.e., inter-interface distance) is referred to as an X-axis direction, and a direction perpendicular to both the Z-axis and the X-axis is referred to as a Y-axis direction.

As for two directions of the Z-axis, a direction from the light exit surface of the waveguide 10 to the light incident surface of the waveguide 10 is referred to as a + (plus) direction of the Z-axis whereas an opposite direction is referred to as a − (minus) direction of the Z-axis. As for two directions of the X-axis, a direction from the first interface 16 to the second interface 18 is referred to as a + (plus) direction of the X-axis whereas an opposite direction is referred to as a − (minus) direction of the X-axis. As for two directions of the Y-axis, a direction in which an inter-interface distance between the first interface 16 and the second interface 18 gradually decreases is referred to as a + (plus) direction of the Y-axis whereas an opposite direction is referred to as a − (minus) direction of the Y-axis.

In the case of the waveguide 10, the Y-axis is assumed to include a bisector of an angle between the first interface 16 and the second interface 18. That is, a symmetric axis of the waveguide 10 is the Y-axis, and the waveguide 10 has a symmetric shape with respect to the Y-axis.

The inter-interface distance between the first interface 16 and the second interface 18 can be described as an inter-interface distance perpendicular to the Y-axis which is the symmetrical axis.

Even if the waveguide 10 has an asymmetrical shape with respect to the Y-axis, still, a distance perpendicular to the Y-axis which includes the bisector of the angle formed between the first interface 16 and the second interface 18 can be referred to as the inter-interface distance.

The following describes an arrangement of the waveguide 10, with reference to the X, Y, and Z axes.

The first interface 16 and the second interface 18, each of which is an interface between the metallic member 11 and the dielectric member 12, gradually approach each other in the plus direction of the Y-axis, and change, at the flections P16 and P18, respective angles at which the first interface 16 and the second interface 18 approach each other. Then, in the second area 14, the first interface 16 and the second interface 18 gradually approach each other in the plus direction of the Y-axis, and are connected with each other at the ends 16d and 18d.

A rate of change of the inter-interface distance between the first interface 16 and the second interface 18 which gradually approach each other toward the plus direction of the Y-axis is higher in the first area 13 than in the second area 14. The flections P16 and P18 can also be described as changing points which respectively change (i) a gradient of a straight line between the ends 16c and 16d and (ii) a gradient of a straight line between the ends 18d and 18c (i.e., change a rate of change of the inter-interface distance) in the cross-section of the waveguide 10 parallel with the X-Y plane.

This can also be described as below. In the waveguide 10, the metallic member 11 has a groove which is made of the dielectric member 12 and has, as its tip, the ends 16d and 18d. A width of the groove gradually decreases toward the plus direction of the Y-axis. The flections P16 and P18 at which a rate of decrease in width of the groove is changed are formed on corresponding side surfaces which define the width.

An angle between the first interface 16 including the end 16d and the second interface 18 including the end 18d is preferably an acute angle. This makes it possible to reduce a size of a spot of near-field light which exits from the waveguide 10. In addition, an angle between the first interface 16 and the second interface 18 is preferably acute. That is, it is preferable that the first interface 16b and the second interface 18b be completely flat planes, and connected with each other at the ends 16d and 18d.

However, in terms of manufacture, it is difficult to form the ends 16d and 18d by connecting two completely flat planes. In addition, if, for example, the first interface 16b and the second interface 18b do not form an angle therebetween but does form a curve instead, and a radius of curvature of the curve is large, a large near-field light spot is caused.

However, as shown in simulation results to be described later, a near-field light spot (near-field light) arises on a dielectric member 12 side with respect to the ends 16d and 18d. Therefore, if an angle between the first interface 16b and the second interface 18b is acuter than a certain angle, a size of the near-field light spot is equal to that of an ideal case where the first interface 16b and the second interface 18b which are completely flat planes are connected with each other at the ends 16d and 18d.

As described above, in the waveguide 10, a rate of decrease at which an inter-interface distance between the first interface 16 and the second interface 18 gradually decreases toward the ends 16d and 18d is constant with respect to the Y-axis, except for the flections P16 and P18. That is, the first interfaces 16a and 16b and the second interfaces 18a and 18b are flat surfaces and any two interfaces facing each other are provided so as to incline to each other.

Assume that the first interface 16a and the second interface 18a are extended so as to intersect with each other at a position Q, when the waveguide 10 is viewed from the light incident surface side or from the light exit surface side. In this case, the waveguide 10 has a V-shaped angle formed by the end 16c, the position Q, and the end 18c, and another V-shaped angle formed by the flection P16, the end 16d (end 18d), and the flection P18. Since the waveguide 10 has a symmetrical shape with respect to the Y-axis, the position Q lies on the Y-axis.

In the following description, an angle formed between respective extended lines of the first interface 16a and the second interface 18d and the position Q where the extended lines intersect with each other (i.e., an angle formed by the end 16c, the position Q, and the end 18c) is referred to as a first vertex angle $\theta 1$ ($\theta 1$ in FIG. 2) while an angle formed between the first interface 16b and the second interface 18b (i.e., an angle formed by the flection P16, the end 16d (the end 18d), and the flection P18) is referred to as a second vertex angle $\theta 2$ ($\theta 2$ in FIG. 2). A position indicated by a Y-coordinate of the flections P16 and P18 on the Y-Z cross-section of the waveguide 10 is referred to as a position Y0. A position indicated by a Y-coordinate of the ends 16c and 18c on the Y-Z cross-section is referred to as a position Y1. A position indicated by a Y-coordinate of the ends 16d and 18d on the Y-Z cross-section is referred to as a position Y2.

(Near-Field Light)

The following describes near-field light generated in the waveguide of the present embodiment, with reference to FIGS. 3(a) through 6 which show simulation results obtained by use of an FDTD (Finite-Difference Time-Domain) method.

The following shows an intensity distribution and a phase distribution of surface plasmon polaritons in each of waveguides 110 and 210. In each of the waveguides 110 and 210, no flection is provided on the interfaces between the metallic member and the dielectric member.

Figure 3A:
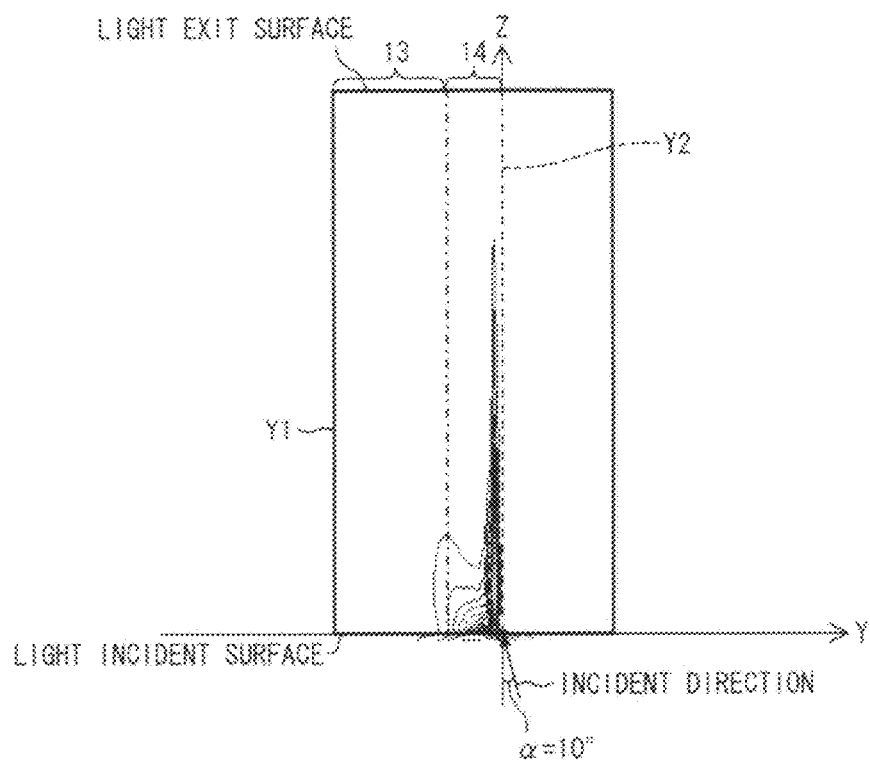
FIG. 3(a) is a diagram showing an intensity distribution obtained in a case where light enters the waveguide of the present invention.
Figure 3B:
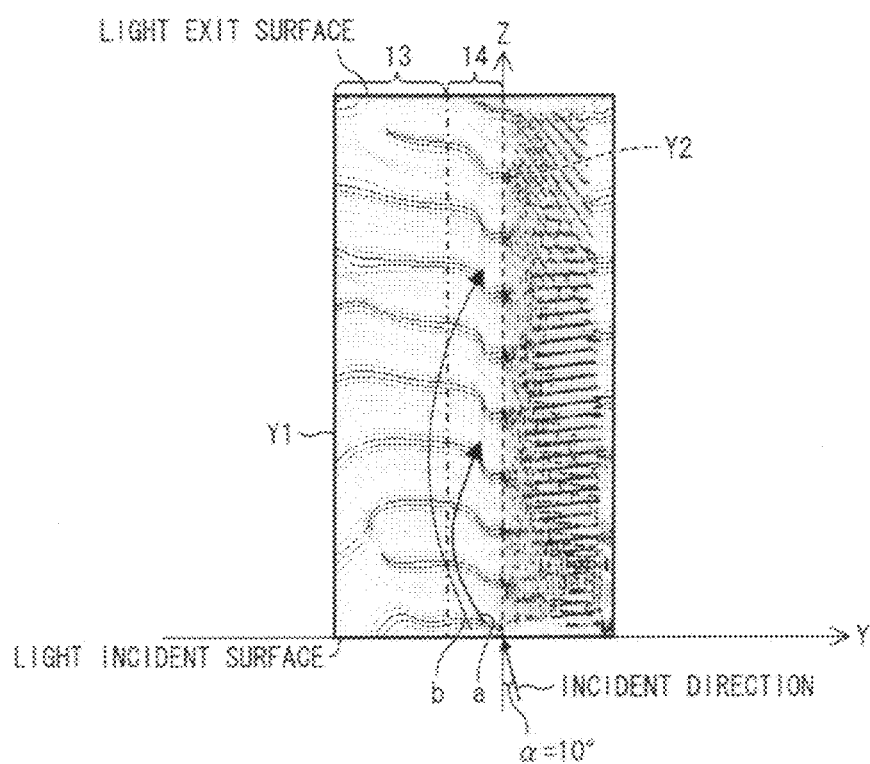
FIG. 3(b) is a diagram showing a phase distribution obtained in this case.

FIG. 3(a) is a diagram showing an intensity distribution of surface plasmon polaritons on the Y-Z cross-section which intensity distribution is obtained in a case where the waveguide 10 is irradiated with a laser. FIG. 3(b) is a diagram showing a phase distribution of the surface plasmon polariton shown in FIG. 3(a).

Figure 4A:
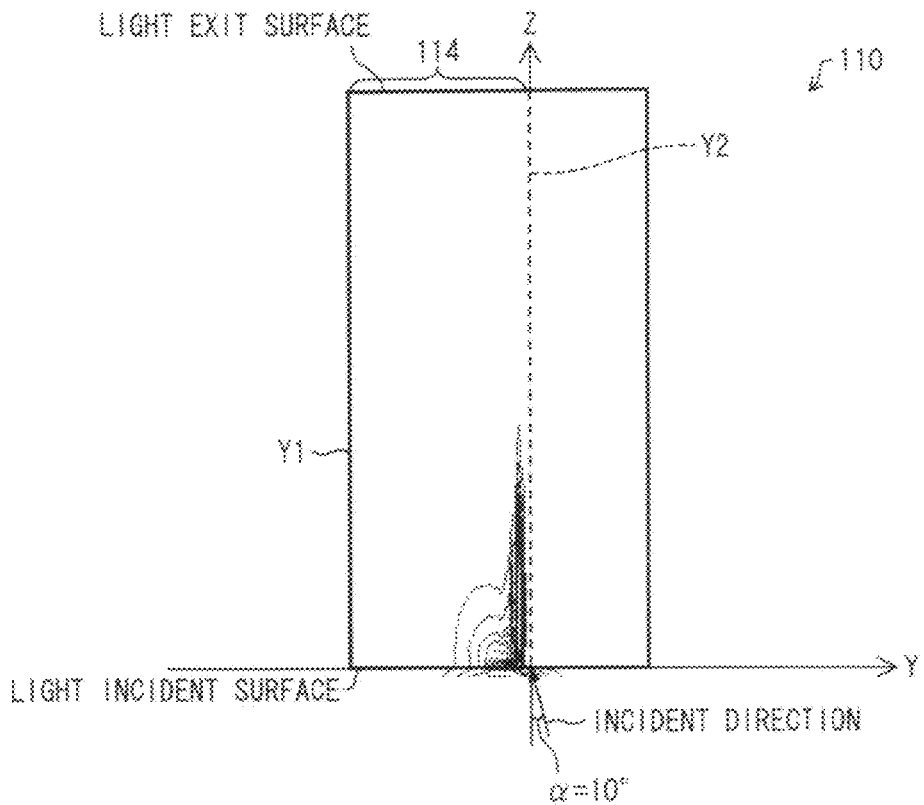
FIG. 4(a) is a diagram showing an intensity distribution obtained in a case where light enters a waveguide which is a comparative example.
Figure 4B:
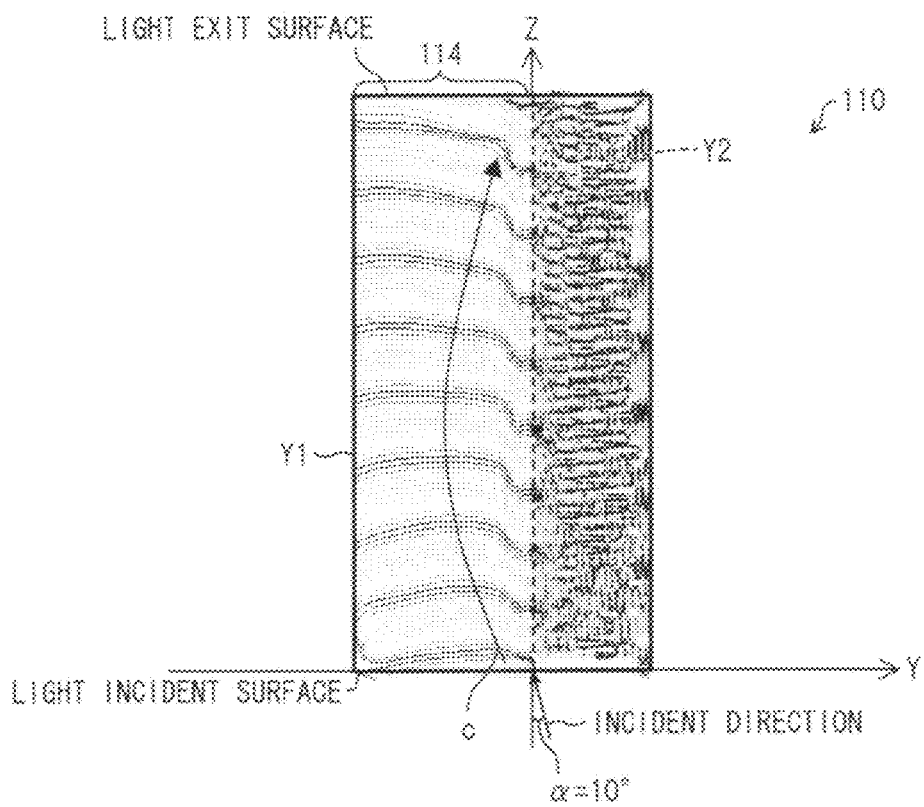
FIG. 4(b) is a diagram showing a phase distribution obtained in this case.

FIG. 4(a) is a diagram showing an intensity distribution of surface plasmon polaritons on the Y-Z cross-section which intensity distribution is obtained in a case where the waveguide 110 which is a comparative example is irradiated with a laser. FIG. 4(b) is a diagram showing a phase distribution of the surface plasmon polaritons shown in FIG. 4(a).

Figure 5A:
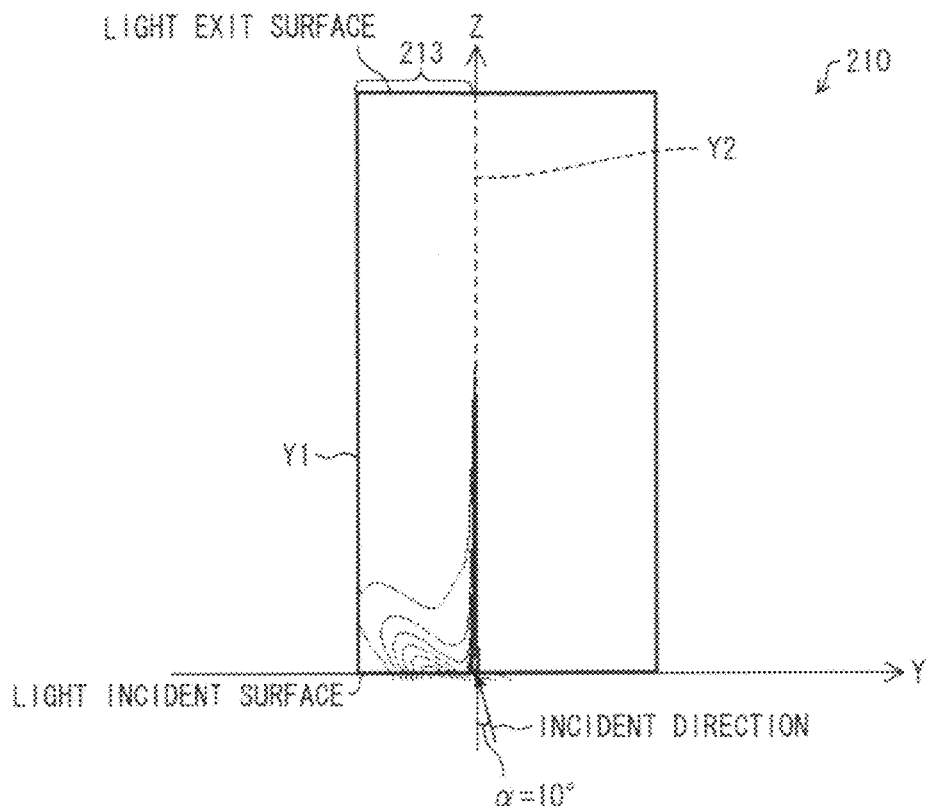
FIG. 5(a) is a diagram showing an intensity distribution obtained in a case where light enters a waveguide which is another comparative example.
Figure 5B:
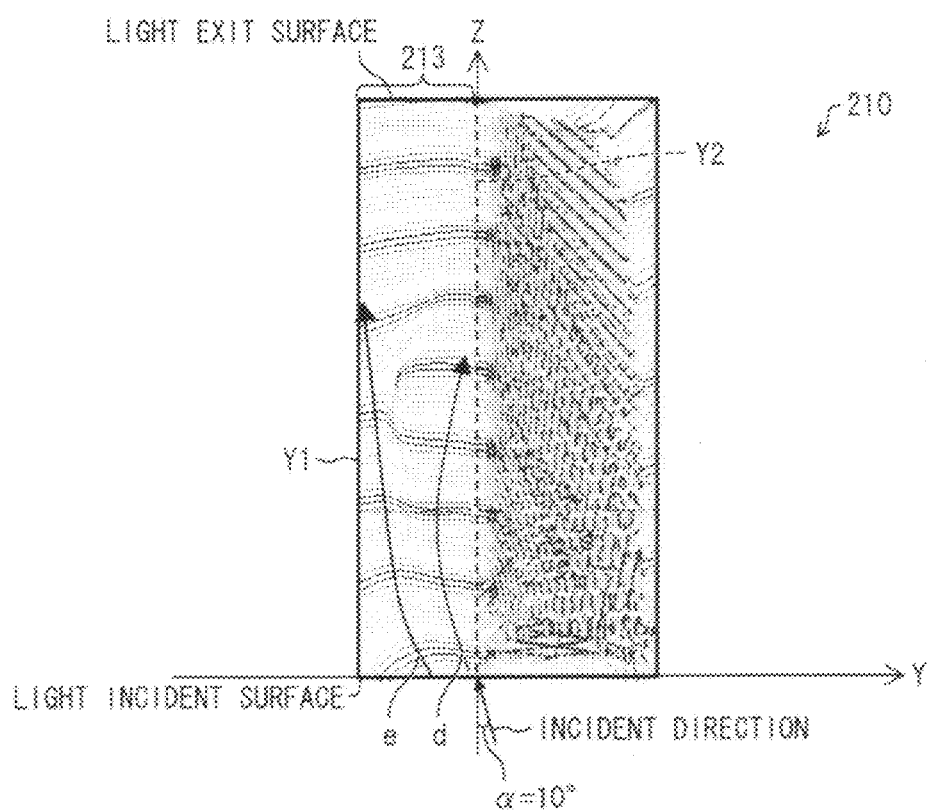
FIG. 5(b) is a diagram showing a phase distribution obtained in this case.

FIG. 5(a) is a diagram showing an intensity distribution of surface plasmon polaritons on the Y-Z cross-section which intensity distribution is obtained in a case where the waveguide 210 which is another comparative example is irradiated with a laser. FIG. 5(b) is a diagram showing a phase distribution of the surface plasmon polariton shown in FIG. 5(a).

The waveguide 110 has the same arrangement as the waveguide 10 except that the first interface 16 is made up of only the first interface 16b and the second interface 18 is made up of only the second interface 18b. That is, a first interface (not illustrated) and a second interface (not illustrated) of the waveguide 110 each of which is an interface between a metallic member and a dielectric member are each made up of one flat plane. A vertex angle formed between the first interface and the second interface is $\theta 2$. An area 114 is an area including (i) the metallic member which sandwiches the dielectric member and (ii) the dielectric member sandwiched by the metallic member. The area 114 corresponds to the second area 14 of the waveguide 10.

The waveguide 210 has the same arrangement as the waveguide 10 except that the first interface 16b and the second interface 18b are omitted and the first interface 16a and the second interface 18a are connected with each other. That is, a second interface (not illustrated) and a first interface (not illustrated) of the waveguide 210 each of which is an interface between a metallic member and a dielectric member are each made up of one flat plane. A vertex angle formed between the flat planes is θ1. An area 213 is an area including (i) the metallic member which sandwiches the dielectric member and (ii) the dielectric member sandwiched by the metallic member. The area 213 corresponds to the first area 13 of the waveguide 10.

In FIG. 3(a) through FIG. 5(b), each of dashed lines indicates a position (position Y2) of an end where the first interface and the second interface are connected with each other. In FIG. 3(a) and FIG. 3(b), a dashed-dotted line indicates the position Y0.

In the simulation, a material of the metallic member 11 is gold; a material of the dielectric member 12 is air; the first vertex angle θ1 is 90°; and the second vertex angle θ2 is 11°. The position Y0 is set 520 nm from the origin point in the minus direction of the Y-axis.

Used as the incident light was a laser whose wavelength was 635 nm, whose width of corresponds to an intensity of $1/e^2$, and whose intensities form a Gaussian distribution. The laser was emitted to the position Y2 on the light incident surface in a direction inclined in the minus direction of the Y-axis by α=10° with respect to the Z-axis.

This is for observing, under the assumption that the incident light is diverging light, light which enters, in a normal situation, the waveguide at an angle at which the light is unlikely to converge at the position Y2 on the light incident surface. A polarization direction of the incident light is the x-axis direction.

Comparisons between FIG. 3(a) and FIG. 4(a) and between FIG. 3(a) and FIG. 5(a) show that the waveguide 10 of the present embodiment which includes the first area 13 and the second area 14 has a higher maximal intensity in the vicinity of the position Y2, and has that longer distance parallel with the direction of the Z-axis between which surface plasmon polaritons converges, as compared to the waveguide 110 including the area 114 and to the waveguide 210 including the area 213. This can be explained as below on the basis of comparisons between FIG. 3(b) and FIG. 4(b) and between FIG. 3(b) and FIG. 5(b).

In the case of the waveguide 10 of the present embodiment, the surface plasmon polaritons excited in the vicinity of the position Y2 in the second area 14 on the light incident surface side are reflected at the position Y0 which is a boundary between the first area 13 and the second area 14, and travel toward the vicinity of the position Y2 again (see an arrow a in FIG. 3(b)). Further, since an inter-interface distance changes more rapidly in the first area 13 than the first area 14, an effective refractive index of the surface plasmon polaritons also increases more rapidly in the first area 13 than in the second area 14.

That is, an effective refractive index of the surface plasmon polaritons steeply decreases which surface plasmon polaritons have reached the first area 13 across the position Y0 from the second area 14. As a result, the surface plasmon polaritons gradually change their propagation direction so as to eventually converge in the vicinity of the end 18d where an effective refractive index is high (see an arrow b in FIG. 3(b)).

Furthermore, a change of the inter-interface distance in the first area 13 is steeper than in the second area 14. Accordingly, an effective refractive index of the surface plasmon polaritons in the first area 13 changes more rapidly than in the second area 14. As a result, the surface plasmon polaritons which have propagated away from the vicinity of the position Y2 on the light incident surface side change their propagation direction so as to return to that position in the vicinity of the position Y2 which is closer to the light incident surface as compared to the case of the waveguide having no first area 13. This makes it possible to reduce a thickness of the waveguide 10 thinner enough than the waveguide having no first area 13 to the extent that manufacture of the waveguide 10 is easy.

On the other hand, the waveguide 10 has no flection at a position of an interface between the metallic member and the dielectric member. Therefore, a rate of change in inter-interface distance is gentle between the positions Y1 and Y2 at which position Y1 an inter-interface distance between the first interface and the second interface is maximal and at which position Y2 the inter-interface distance is minimal. Accordingly, an effective refractive index of the surface plasmon polaritons changes gently therebetween. Accordingly, as illustrated in FIG. 4(b), a small proportion of surface plasmon polaritons excited in the vicinity of the position Y2 on the light incident surface side is reflected in the area 114 (i.e., change their propagation direction) so as to return to the vicinity of the position Y2. In addition, the propagation direction is changed gently. As a result, the surface plasmon polaritons reflected in the area 114 (indicated by an arrow c in FIG. 4(b)) reach a position away from the light incident surface, in the vicinity of the position Y2. For this reason, the waveguide 110 is required to be thick.

In the waveguide 210, the vertex angle formed at the position Y2 between the first interface and the second interface is θ1, which is wider than the second vertex angle θ2 of the waveguide 10. That is, in the area 213 of the waveguide 210, a rate of change in inter-interface distance which changes between the positions Y1 and Y2 is higher than in the second area 14 of the waveguide 10.

That is, in the area 213 of the waveguide 210, an effective refractive index of the surface plasmon polaritons changes more steeply than in the second area 14 of the waveguide 10. Therefore, the surface plasmon polaritons excited in the vicinity of the position Y2 on the light incident surface side are reflected in the area 213 due to the steep change in effective refractive index so as to change their propagation direction. As a result, the surface plasmon polaritons return to the vicinity of the position Y2 (see an arrow d in FIG. 5(b)).

However, according to the arrangement of the waveguide 210, the vertex angle formed at the position Y2 between the first interface and the second interface is the wide angle θ1. Accordingly, most of the incident light propagates in an area where an inter-interface distance is wide (i.e., propagates in the vicinity of the position Y1). The incident light propagating in the vicinity of the position Y1 is not converted into surface plasmon polaritons but propagates from the position Y1 to the outside of the area 213 as it is (see an arrow e in FIG. 5(b)). This is the reason why an intensity of near-field light is weak in the arrangement of the waveguide 210.

In contrast, since the waveguide 10 of the present embodiment includes the first area 13 and the second area 14, the surface plasmon polaritons reflected at the position Y0 (i.e., at flections P16 and P18) which is a boundary between the first area and the second area and surface plasmon polaritons reflected in the first area 13 eventually converge at the position Y2 in the vicinity of the light exit surface. As a result, near-field light with a strong intensity can be obtained.

Figure 6:
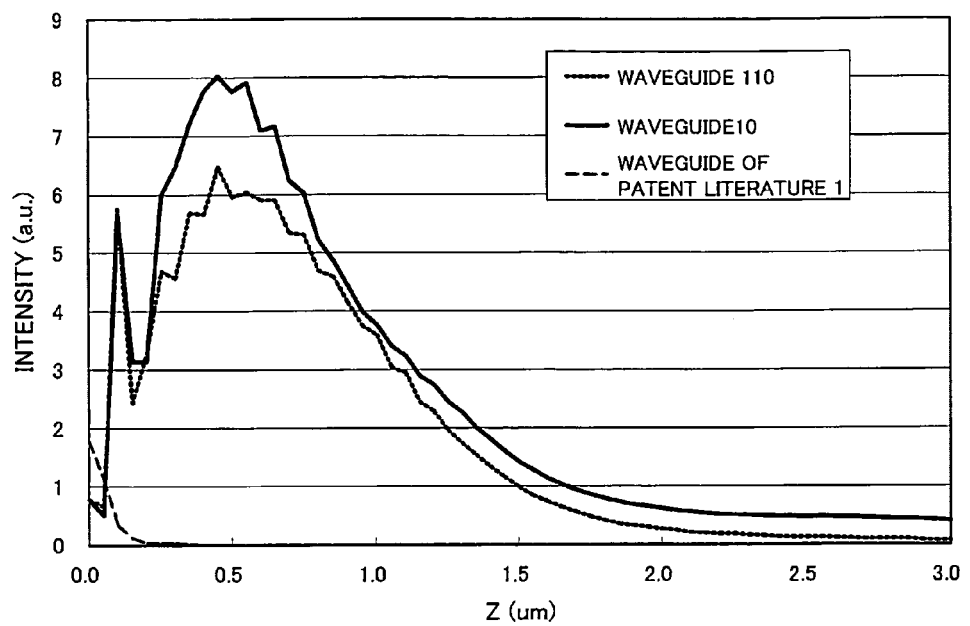
FIG. 6 is a graph showing respective intensity distributions, with respect to a Y-direction, on light exit surfaces of the waveguide of the present invention, the waveguide illustrated in FIG. 4 as a comparative example, and the waveguide disclosed in Patent Literature 1.

FIG. 6 is a graph showing an intensity distribution of surface plasmon polaritons of the simulation results shown in FIG. 3(a) and FIG. 3(b) and FIG. 4(a) and FIG. 4(b). Specifically, the graph shows the intensity distribution with respect to a distance parallel with the Z-direction. In FIG. 6, the continuous line indicates the result of the waveguide 10 of the present embodiment; the dotted line indicates the result of the waveguide 110; and the dashed line indicates the result of the waveguide disclosed in Patent Literature 1. The result of Patent Literature 1 was obtained by letting light polarized in the Y-direction enter a rectangular slit having a width of 200 nm. Each result shows how much an intensity depends on a distance parallel with the Z-direction at a point of the strongest intensity on the X-Y plane. The light incident surface is located at a position where Z=100 nm.

FIG. 6 shows that the waveguide 10 including the first area 13 and the second area 14 makes it possible to obtain a higher intensity than the waveguide 110 having no flections P16 and P18. In addition, in the case of the waveguide of Patent Literature 1 which has the rectangular slit, an intensity decreases simply. However, the V-shaped waveguides 10 and 110 can collect the surface plasmon polaritons at approximately 400 nm from the light incident surface for the second time.

Further, on the assumption of a more realistic situation, experiments were conducted in order that near-field light generated in the waveguide 10 may be compared with that generated in the waveguide 110. The following describes the experiments, with reference to FIGS. 2, 3(a) and 3(b), 4(a) and 4(b), 16, and 17. The experiments were conducted by simulation using the FDTD method.

The waveguides 10 and 110 had a width of 400 nm in the Z direction. Light incident on each of the waveguides 10 and 110 was a laser whose intensities form such a Gaussian distribution that the laser has an intensity of $1/e^2$ in a case where the laser has radiation angles of 10° in the X-direction and 20° in the Y-direction as one example of radiation angles of a semiconductor laser. In simulation of the incident light, a center of intensities of the incident light was set to the position of the end 16d (18d) on the light incident surface. A polarization direction of the incident light was the X-direction.

The waveguide 10 was arranged such that: a material of the metallic member 11 was gold; a material of the dielectric member 12 was air; the first vertex angle θ1 was 20°; and the second vertex angle θ2 was 10°. The position Y0 was located at 1000 (nm) from the origin point in the minus direction of the Y-axis.

Also simulated for comparison as the arrangement of Patent Literature 1 was a case where light polarized in the Y-direction enters a waveguide in which a metallic member having a width of 400 nm in the Z-direction has a rectangular slit having a width of 400 nm.

FIG. 16 is a graph showing intensities of near-field light, with respect to the Y-direction, on light exit surfaces (X-Y plane). In FIG. 16, the thinner continuous line (flections are provided) indicates a result of the waveguide 10 of the present embodiment; the dashed line (no flection is provided) indicates the waveguide 110; and the thicker continuous line indicates the waveguide disclosed in Patent Literature 1 (the waveguide having the rectangular slit having a width of 400 nm). In each of the waveguides 10 and 110, light converges right before the ends 18d and 218d (i.e., converges at that position in the vicinity of the ends 18d and 218d in which a distance in the Y-direction takes a negative value). This indicates that, in the waveguide 10, a near-field light spot was formed on the dielectric member 12 side with respect to the end 18d (16d).

However, in a case where light polarized in the Y-direction enters the waveguide of Patent Literature 1 which has the rectangular slit, the surface plasmon polaritons propagate along the edge of the metallic member. As a result, a near-field light spot is formed at a position where Y=0. The graph shown in FIG. 16 also shows that the near-field light which exits from the waveguide 10 of the present embodiment has the strongest intensity.

FIG. 17 is a diagram showing an intensity distribution of the near-field light on the light exit surface of the waveguide 10 of the present embodiment. As shown in FIG. 17, the near-field light spot is a minute near-field light spot having a diameter of not more than 50 nm.

Therefore, it is possible to reduce a film thickness of a waveguide thin enough to the extent that ease of manufacture thereof is not impaired and to efficiently convert incident light into near-field light which forms a small spot, by arranging the waveguide so that, as is the case with the waveguide 10 of the present embodiment, the first interface 16 of the metallic member 11 against the dielectric member 12 consists of the first interface 16a and the first interface 16b provided so as to form a flection in combination with the first interface 16a while the second interface 18 of the metallic member 11 against the dielectric member 12 consists of the second interface 18a and the second interface 18b provided so as to form a flection in combination with the first interface 18a.

FIG. 6 shows results obtained in a case where the surface plasmon polaritons converge at a position of 400 nm. However, even if a waveguide is used as a waveguide such as those disclosed in Patent Literatures 2 and 3, a strong intensity can be obtained on the light exit surface of the waveguide by adjusting structural parameters such as Y0, θ1, and θ2. This indicates that independently of a length (distance parallel with the Z-direction) of a waveguide, the arrangement is preferable in which the first interface 16 of the metallic member 11 against the dielectric member 12 consists of the first interface 16a and the first interface 16b provided so as to form a flection in combination with the first interface 16a while the second interface 18 of the metallic member 11 against the dielectric member 12 consists of the second interface 18a and the second interface 18b provided so as to form a flection in combination with the second interface 18a.

In the waveguide 10, a rate at which an inter-interface distance between the first interface 16 and the second interface 18 decreases from the ends 16c and 18c toward the ends 16d and 18d does not change at positions except the positions of the flections P16 and P18. In other words, in the X-Y cross-section of the waveguide 10, the first interfaces 16a and 16b, and the second interfaces 18a and 18b are expressed by straight lines. That is, the X-Y cross-section of the waveguide 10 can be described as two stacked V-shaped angles.

However, as described above, the first interface 16 and the second interface 18 which are interfaces of the metallic member 11 against the dielectric member 12 can be freely arranged, provided that surface plasmon polaritons are reflected at the flections P16 and P18 or within the first interface 16a and the second interface 18a.

(Modification of Waveguide)

Figure 7:
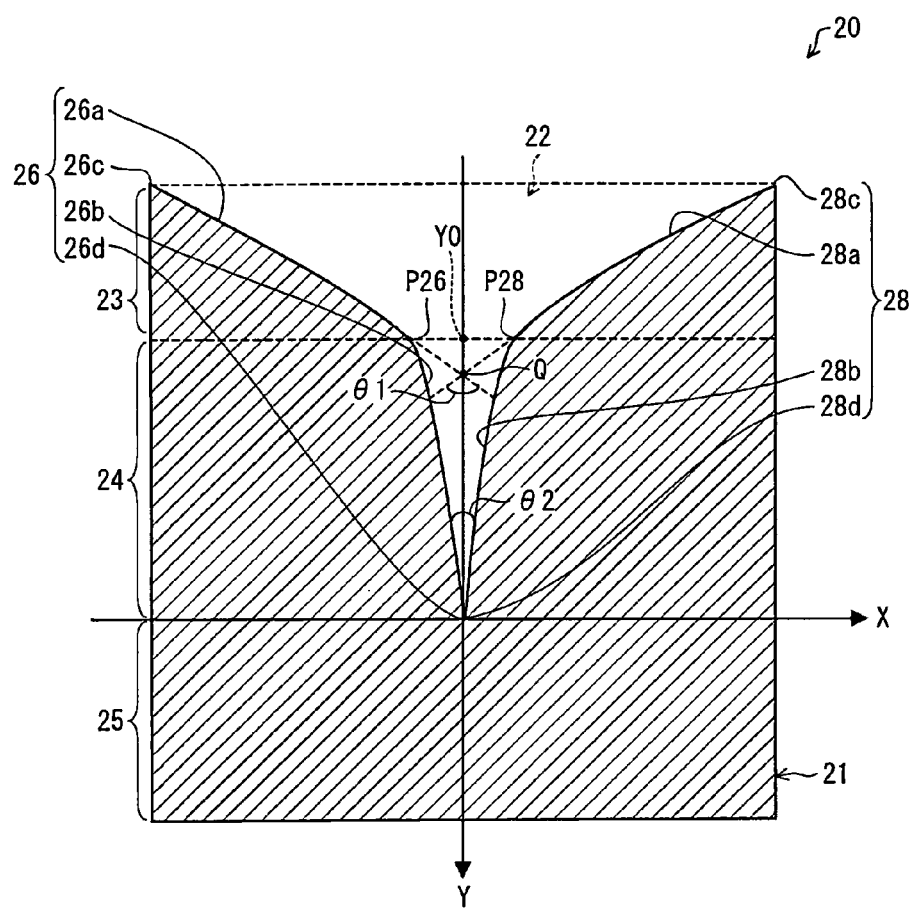
FIG. 7 is a cross-sectional view illustrating another waveguide of the present invention.
Figure 8:
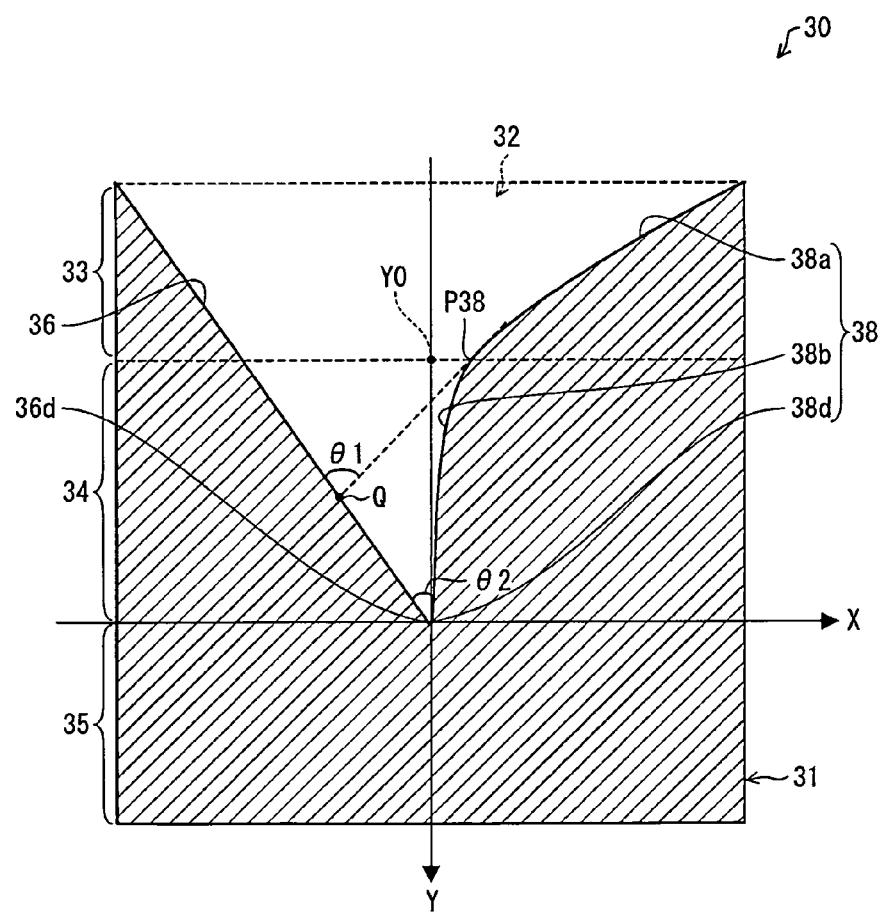
FIG. 8 is a cross-sectional view illustrating still another waveguide of the present invention.
Figure 9:
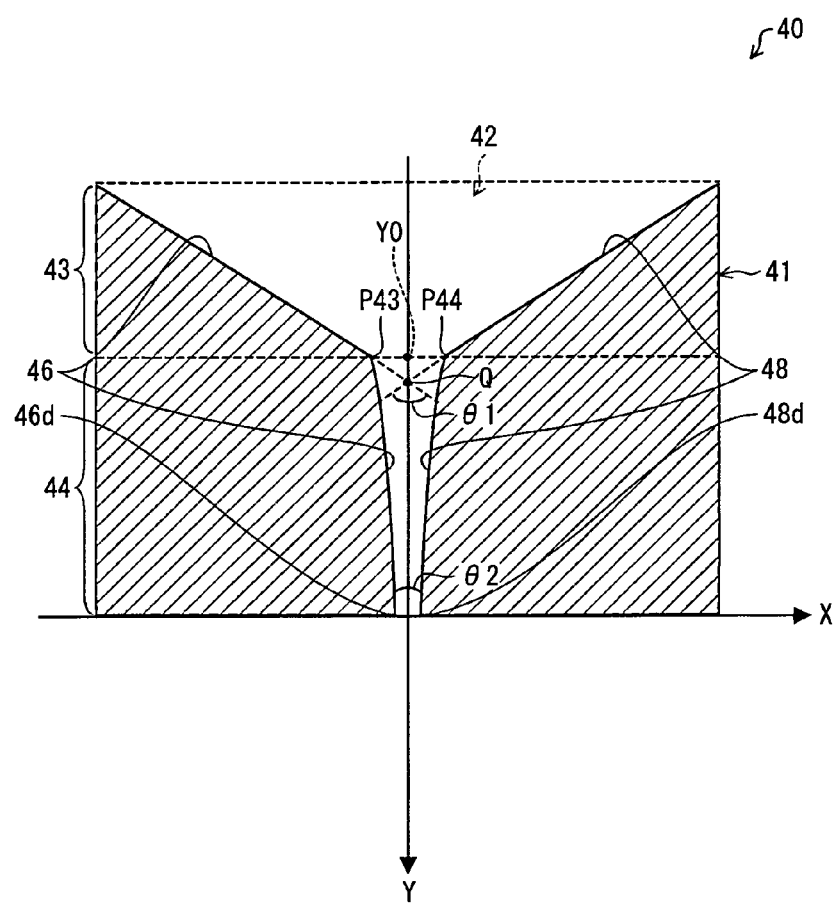
FIG. 9 is a cross-sectional view illustrating yet another waveguide of the present invention.

The following describes a modification of the waveguide 10, with reference to FIGS. 7 through 9.

Figure 10:
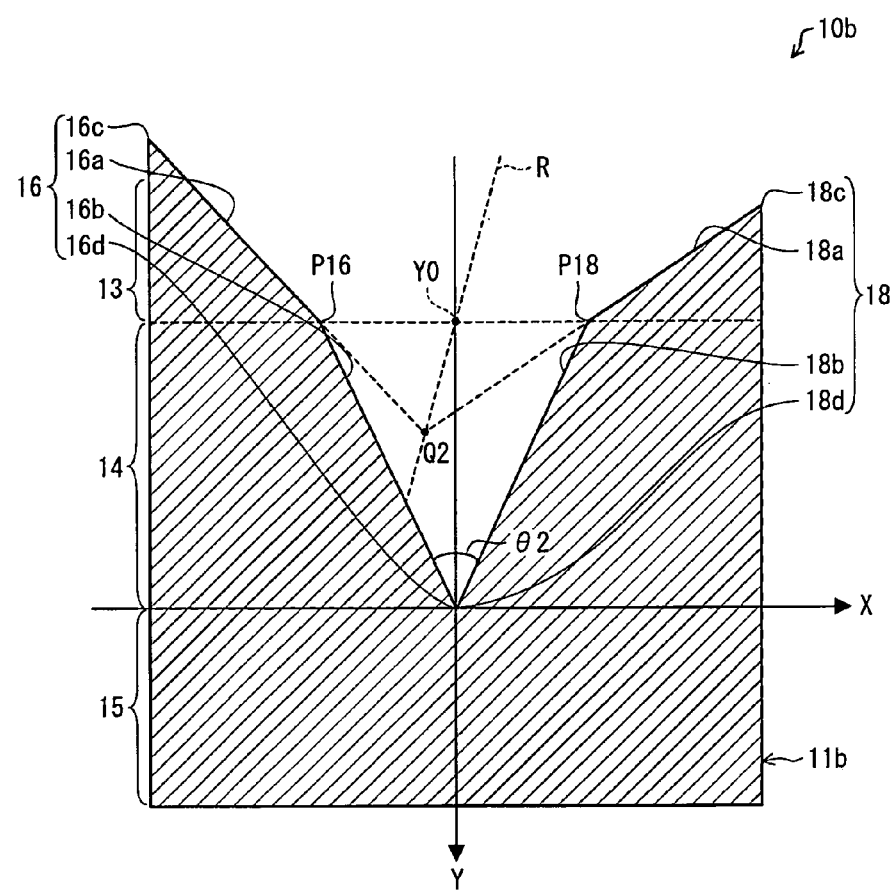
FIG. 10 is a cross-sectional view illustrating still yet another waveguide of the present invention.

The waveguide 10 can be arranged as a waveguide 20 illustrated in FIG. 7, a waveguide 30 illustrated in FIG. 8, a waveguide 40 illustrated in FIG. 9, a waveguide 10b illustrated in FIG. 10, or the like.

In the waveguide 10, the first interface 16 and the second interface 18 can each have a curved shape.

FIG. 7 is a diagram illustrating an arrangement of a waveguide in which the first interface and the second interface are gently curved surfaces.

A metallic member 21 of the waveguide 20 includes a first interface 26 and a second interface 28, as an interface between the metallic member 21 and a dielectric member 22. The first interface 26 and the second interface 28 are connected with each other at ends 26d and 28d on one side.

The first interface 26 includes first interfaces 26a and 26b which are provided so as to form a flection therebetween. A boundary point between the first interfaces 26a and 26b is a flection P26.

The second interface 28 includes second interfaces 28a and 28b which are provided so as to form a flection therebetween. A boundary point between the second interfaces 28a and 28b is a flection P28.

The first interface 26a and the second interface 28a are gently curved surfaces. The first interface 26a is connected with the first interface 26b so as to form the flection P26 therebetween. Similarly, the second interface 28a is connected with the second interface 28b so as to form the flection P28 therebetween. The rest is arranged in the same way as the waveguide 10.

A first area 23 and a second area 24 are areas which are bordered (partitioned) from each other in reference to the flections P26 and P28. A third area 25 is an area which is bordered (partitioned) from the second area 24 in reference to the end 26d of the first interface 26 and the end 28d of the second interface 28.

The first interfaces 26a and 26b of the first interface 26 are encompassed by the first area 23 and the second area 24, respectively.

Thus, the first interfaces 26a and 26b, and the second interfaces 28a and 28b are realized as curved surfaces (i.e., are curved). As compared to a case where the first interfaces 16a and 16b, and the second interfaces 18a and 18b are realized as flat surfaces, this makes it possible to increase (i) a rate of change of an inter-interface distance which changes from an inter-interface distance between the ends 26d and 28d to an inter-interface distance between the flections P26 and P28, and (ii) a rate of change of an inter-interface distance which changes from an inter-interface distance between the flections P26 and P28 to an inter-interface distance between the ends 26c and 28c.

This makes it possible to converge more, to the ends 26d and 28d, surface plasmon polaritons propagating along the first interfaces 26a and 26b, and those propagating along the second surfaces 28a and 28b. This makes it possible to increase an intensity of near-field light to be obtained on the light exit surface of the waveguide 20. In other words, the incident light can be converted into near-field light which forms a small spot.

The flections P26 and P28 can be curved surfaces. In this case, the flections P26 and P28 can serve as a boundary between the first interfaces 26a and 26b and a boundary between the second interfaces 28a and 28b, respectively, provided that the flections P26 and P28 are sufficiently smaller than a wavelength of the surface plasmon polaritons. That is, the surface plasmon polaritons excited in the vicinity of the ends 26d and 28d are reflected at the flections P26 and P28. By contrast, if the flections P26 and P28 are larger than the wavelength of the surface plasmon polaritons, the surface plasmon polaritons are not reflected at the flections P26 and P28 but mainly reflected on the first interface 26a and the second interface 28a.

FIG. 8 is a diagram illustrating an arrangement of the waveguide 30 in which a flection is formed on one of two interfaces between a metallic member and a dielectric member.

The waveguide 30 has an arrangement corresponding to that arrangement of the waveguide 20 in which the first interface 26, which is one of the two interfaces of the metallic member 21: the first interface 26 and the second interface 28, is realized as a flat surface. The rest is arranged in the same way as the waveguide 20.

A first interface 36 of a metallic member 31 is not provided with a flection but is realized as one flat surface. A second interface 38 of the metallic member 31 includes second interfaces 38a and 38b which correspond respectively to the second interfaces 28a and 28b of the aforementioned metallic member 21.

The first interface 36 has an end 36d on one side. Similarly, the second interface 38 has an end 38d on the one side. The ends 36d and 38d have contact with each other.

A first area 33 and a second area 34 are areas which are bordered (partitioned) from each other in reference to a flection P38. A third area 35 is an area which is bordered (partitioned) from the second area 34 in reference to the end 36d of the first interface 36 and the end 38d of the second interface 38.

The second interfaces 38a and 38b of the second interface 38 are encompassed by the first area 33 and the second area 34, respectively.

At least one of the second interfaces 38a and 38b can be flat surfaces, as is the case with the waveguide 10.

In a case where the second interfaces 38a and 38b are curved surfaces, surface plasmon polaritons propagating along the curved surfaces must constantly change their propagation direction. No problem arises if the curved surfaces have small curvatures. However, if the curved surfaces have large curvatures, there occur diffusion, reflection, etc. of the surface plasmon polaritons propagating along the curved surfaces. This leads to a loss of surface plasmon polaritons.

Assume that a waveguide is arranged in such a manner that in the waveguide 30, only the second interface 38 which is one of the two interfaces of the metallic member 31 against the dielectric member 32 is inflected so that the first interface 36 and the second interface 38 may be asymmetrical with each other. In this case, an orientation of an electric field vector acting between the first interface 36 and the second interface 38 is changed at the position of the flection P38. This leads to a loss of surface plasmon polaritons propagating along the first interface 36 and the second interface 38.

Therefore, it is possible to prevent most effectively the loss of the surface plasmon polaritons propagating along interfaces, by employing that arrangement of the waveguide 10 in which: the first interface 16 and the second interface 18 are symmetrical with each other; the first interfaces 16a and 16b, and the second interfaces 18a and 18b are realized as flat surfaces; and the first interface 16a and the second interface 18a are provided so as to incline to each other while the first interface 16b and the second interface 18b are provided so as to be incline to each other.

In the case of the waveguide 30, a point where an extended line of the second interface 38a intersects with the first interface 36 is a position Q. A first vertex angle $\theta 1$ is an angle formed, at the position Q, between the first interface 36 and the extended line of the second surface 38a.

FIG. 9 is a diagram illustrating an arrangement of a waveguide 40 in which ends where an inter-interface distance is minimal therebetween are provided so as to be away from each other.

The waveguide 40 includes a first interface 46 on which a flection P43 is formed and a second interface 48 on which a flection P44 is formed, as interfaces between a metallic member 41 and a dielectric member 42.

The first interface 46 and the second interface 48 are not connected but are provided so that respective ends 46d and 48d where an inter-interface distance is minimal therebetween may be away from each other. The rest is arranged in the same way as the waveguide 20.

In the waveguide 40, surface plasmon polaritons converges in the vicinity of the ends 46d and 48d so that near-field light exits from the waveguide 40.

FIG. 10 is a diagram illustrating an arrangement of a waveguide 10b. The waveguide 10b is arranged in the same way as the waveguide 10 except that two interfaces are asymmetrical with each other in the first area 13.

As a metallic member 11b of the waveguide 10b illustrated in FIG. 10 shows, the first interface 16a and the second interface 18a can be asymmetrical with each other. In this case, an extended line of a first interface 16a intersects with an extended line of a second interface 18a not on the Y-axis but at a position Q2 deviated from the Y-axis.

In the present embodiment, a plane perpendicular to the Z-axis is irradiated with the incident light. However, alternatively, a plane perpendicular to the Y-axis can be irradiated with the incident light. In each case, the plane can be irradiated with the incident light at a tilt.

An inter-interface distance and a flection can be determined as below, especially in a case where at least one of the first interface and the second interface is a curved surface, and therefore, it is difficult to determine the first vertex angle θ1 and the second vertex angle θ2.

The following deals with the arrangement of the waveguide 30, as one example of a waveguide in which two interfaces are asymmetrical with each other with respect to the Y-axis.

FIG. 21 is a diagram for explaining an inter-interface distance and a flection of the waveguide 30.

A position Y1 is a position, on the Y-axis, of the ends 36c and 38c while a position Y2 is a position, on the Y-axis, of the ends 36d and 38d.

Assume a circle (sphere) S30 having contact with both the first interface 36 and the second interface 38 of the waveguide 30.

A radius of the circle S30 gradually decreases while the circle S30 moves from the ends 36c and 38c toward the ends 36d and 38d. A center 5030 of the circle S30 thus moving draws a line. In a broad sense, the line can be taken as a bisector of an angle formed between the first interface 36 and the second interface 38.

In FIG. 21, the line is indicated by a dashed-dotted line. Although three circles are illustrated in FIG. 21 for simplicity of explanation, there actually are an infinite number of circles S30.

A distance of a line between the first interface 36 and the second interface 38 which line is perpendicular to the line drawn by the center SO30 can be taken as an inter-interface distance between the first interface 36 and the second interface 38.

An inflection point of (i) inter-interface distances thus obtained or (ii) rates of change of the inter-interface distances corresponds to an flection.

(a) and (b) of FIG. 22 shows the inter-interface distances and the rates of change thereof (i.e., differential values with respect to distances parallel with the Y-axis), respectively.

(a) of FIG. 22 is a graph showing the inter-interface distances, of the waveguide 30, with respect to the distances parallel with the Y-axis. (b) of FIG. 22 is a graph showing the rates of change of the inter-interface distances shown in (a) of FIG. 22.

(a) and (b) of FIG. 22 show that an inter-interface distance gradually decreases from the position Y1 to the position Y2, and an inflection point of the rates of change of the inter-interface distances lies at the position Y0. Accordingly, the position Y0 can be determined to be a position of the flection P38.

The following deals with the arrangement of the waveguide 20, as one example of a waveguide in which two interfaces are symmetrical with each other with respect to the Y-axis. Such a waveguide can be explained in a similar way as the waveguide 30 in which the two interfaces are asymmetrical with each other with respect to the Y-axis.

FIG. 23 is a diagram for explaining an inter-interface distance and an flection of the waveguide 20.

A position Y1 is a position, on the Y-axis, of the ends 26c and 28c while a position Y2 is a position, on the Y-axis, of the ends 26d and 28d. A circle (sphere) S20 has contact with both the first interface 26 and the second interface 28 of the waveguide 20.

A radius of the circle S20 gradually decreases while the circle S20 moves from the ends 26c and 28c toward the ends 26d and 28d. A center 5020 of the circle S20 thus moving draws a line. In a broad sense, the line can be taken as a bisector of an angle formed between the first interface 26 and the second interface 28.

In FIG. 23, the line positionally matches the Y-axis. Actually, there are an infinite number of circles S20 in FIG. 23.

A distance of a line between the first interface 26 and the second interface 28 which line is perpendicular to the line drawn by the center SO20 can be taken as an inter-interface distance between the first interface 26 and the second interface 28.

An inflection point of (i) inter-interface distances thus obtained or (ii) rates of change of the inter-interface distances corresponds to an flection.

In the case of FIG. 23, the Y-axis is a bisector of an angle (θ3 in FIG. 23) formed between the first interface 26 and the second interface 28. An inter-interface distance between the first interface 26 and the second interface 28 is a distance, between the first interface 26 and the second interface 28, parallel with the X-axis perpendicular to the bisector.

Inter-interface distances thus obtained and the rates of change thereof (i.e., differential values with respect to distances parallel with the Y-axis) can also be shown by the graphs of (a) and (b) of FIG. 22, respectively.

Also in the case of the waveguide 20, (a) and (b) of FIG. 22 show that an inter-interface distance gradually decreases from the position Y1 to the position Y2, and an inflection point of the rates of change of the inter-interface distances lies at the position Y0. Accordingly, the position Y0 can be determined to be a position of the flections P26 and P28.

Also for the waveguides 10, 40, and 10b (see FIGS. 2, 9, and 10), preparing such a graph makes it possible to determine a position of a flection in the same manner.

(Method for Manufacturing Waveguide)

Figure 11A:
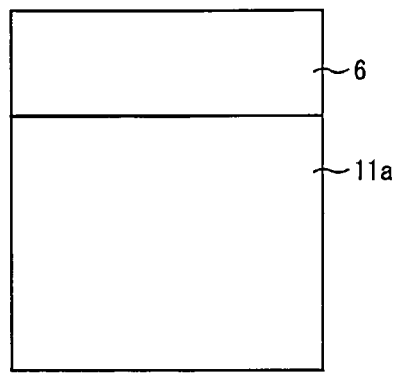
FIG. 11(a) is a diagram illustrating a manufacturing method of a recording head of the present invention, specifically, illustrating a metallic member coated with a photoresist.
Figure 11B:
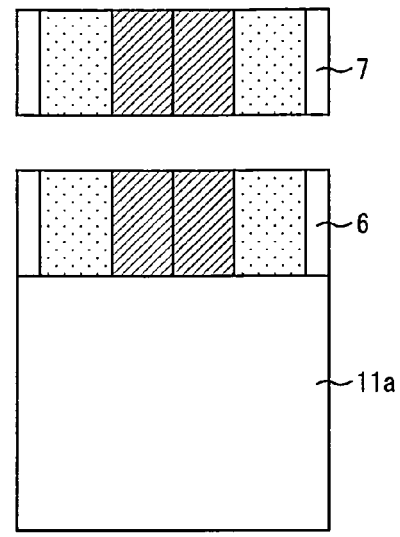
FIG. 11(b) is a diagram illustrating the manufacturing method of the recording head of the present invention, specifically, illustrating mask exposure being performed on the photoresist in FIG. 11(a).
Figure 11C:
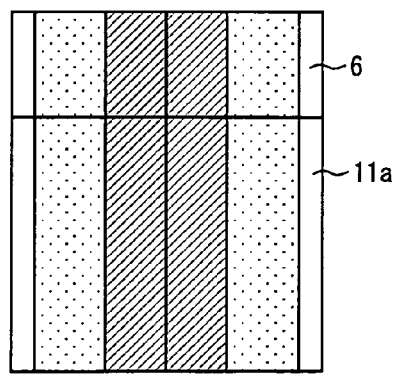
FIG. 11(c) is a diagram illustrating the manufacturing method of the recording head of the present invention, specifically, illustrating patterning by use of the photoresist in FIG. 11(b).
Figure 11D:
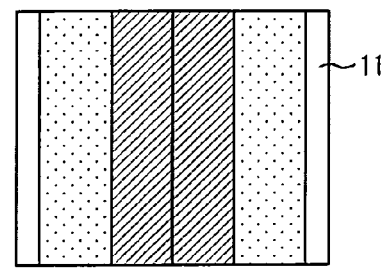
FIG. 11(d) is a diagram illustrating the manufacturing method of the recording head of the present invention, specifically, illustrating a metallic member from which the photoresist in FIG. 11(c) has been removed.

The following describes a method for manufacturing the waveguide 10 of the present embodiment, with reference to FIG. 11(a) through FIG. 11(d). FIG. 11(a) is a diagram illustrating a metallic member coated with a photoresist. FIG. 11(b) is a diagram illustrating mask exposure being performed on the photoresist in FIG. 11(a). FIG. 11(c) is a diagram illustrating patterning by use of the photoresist in FIG. 11(b). FIG. 11(d) is a diagram illustrating the metallic member from which the photoresist in FIG. 11(c) has been removed.

FIG. 11(a) through FIG. 11(d) are diagrams illustrating the waveguide 10 from the opposite to the Y-direction.

As illustrated in FIG. 11(a), first, a surface of a metallic material 11a to be converted into the metallic member 11 is coated with a photoresist 6 by a spin coater or the like. As illustrated in FIG. 11(b), exposure and development of the photoresist 6 with which the metallic member 11a has been coated are performed by use of a mask 7. The mask 7 has a pattern corresponding to an X-Y cross-sectional shape of the metallic member 11. As a result, the photoresist 6 is patterned so as to have a pattern corresponding to the pattern of the mask 7. As illustrated in FIG. 11(*c*), the metallic material 11*a* is etched by using the patterned photoresist 6 as a mask. As a result, the metallic material 11*a* is patterned so as to have the pattern of the photoresist 6. As illustrated in FIG. 11(*d*), the metallic member 11 is formed by removing the photoresist 6. In a case where a material of the dielectric member 12 is air, the waveguide 10 is thus completed.

In a case where the dielectric member 12 is made of a material except air, a film of a dielectric material is formed by carrying out sputtering or vapor deposition from above the patterned photoresist 6 illustrated in FIG. 11(*c*). Then, the photoresist 6 and the dielectric material are removed. As a result, the waveguide 10 is completed.

The waveguide 10 can also be formed in such a manner that the dielectric member 12 is formed first by etching a part of a dielectric material by a method such as that described above, and then, the metallic member 11 is formed. Alternatively, the waveguide 10 can be formed in such a manner that a film of the metallic member 11 or the dielectric member 12 is formed on a substrate first, and then, the aforementioned steps are carried out.

The aforementioned steps can be carried out from the Z-direction, or can be carried out from the Y-direction by anisotropic etching.

The etching is performed by a wet etching process or a dry etching process such as an ion etching process and a reactive ion etching (RIE) process. In the exposure, an aligner or a stepper is mainly used. Instead of etching, it is possible to employ a process based on FIB (Focused Ion Beam) exposure, electron beam exposure, or nanoimprinting.

(Recording Head)

Figure 12:
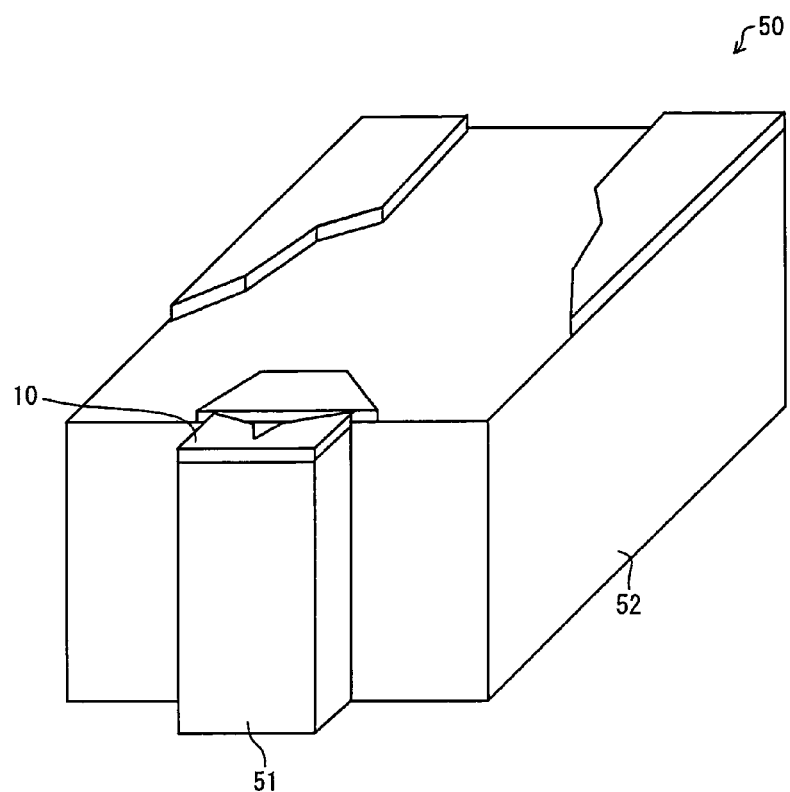
FIG. 12 is a perspective view of a recording head of the present invention.
Figure 13:
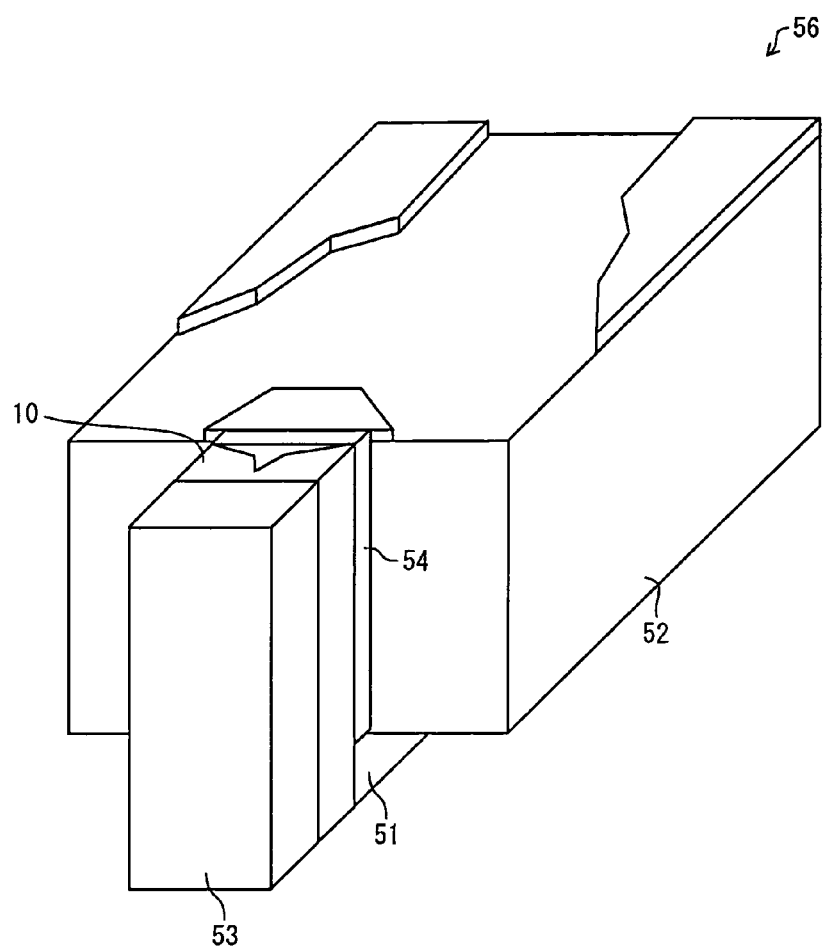
FIG. 13 is a perspective view of another recording head of the present invention.

The following describes a recording head having the waveguide 10, with reference to FIGS. 12 and 13.

FIG. 12 is a perspective view illustrating an arrangement of a recording head 50 having the waveguide 10.

The recording head 50 includes at least the waveguide 10, a light source 51, and a slider 52.

Preferably, the light source 51 is a semiconductor laser, from a viewpoint of downsizing. A wavelength of the semiconductor laser is selected so that surface plasmon polaritons are excited in the waveguide 10. Therefore, the wavelength is preferably selected depending mainly on what is used as a metallic material of the metallic member 11.

In the recording head 50, the light source 50 emits linearly-polarized light into the waveguide 10.

A polarization direction of the linearly-polarized light to be emitted by the light source 51 is a direction (i.e., X-axis direction) perpendicular to a straight line (i.e., Y-axis in FIG. 2) connecting midpoints between the first interface 16 and the second interface 18 in a cross-section perpendicular to the first interface 16 and the second interface 18.

This allows the light source 51 to cause surface plasmon polaritons to propagate along the first interface 16 and the second interface 18 of the waveguide 10. As a result, a high-intensity near-field light can be obtained. Therefore, for example, in a case where a near-field light spot is formed on a medium, it is possible to record, on the medium, a mark of a high S/N ratio. Although another polarization direction can be added, the light source 51 emits light containing at least a polarization component of the X-axis direction.

In a case where the waveguide 10 is asymmetrical with respect to the Y-axis as is the case with, e.g., the waveguide 10*b* illustrated in FIG. 10, a polarization direction of the light source 51 can be a direction perpendicular to a line (dashed line R in FIG. 10) connecting midpoints between the first interface 16*a* and the second interface 18*a*.

A material of the slider 52 is preferably AlTiC. Instead, the material can be one of materials constituting the light source 51. On a surface of the slider 52, a projection and a depression (ABS) are formed in order that an airflow and an air pressure are controlled for the recording head to stably float above a medium.

The waveguide 10, the light source 51, and the slider 52 are preferably integrated as one unit, as illustrated in FIG. 12, from a viewpoint of downsizing. The waveguide 10 is preferably formed on a light exit surface of the light source 51.

The light source 51 is provided on a surface of the slider 52, and on the light exit surface of the light source 51, the waveguide 10 is provided. The light exit surface of the waveguide 10 preferably protrudes at the same level as a plane containing the ABS on the slider 52, or further protrudes toward a medium. This makes it possible to irradiate, at a sufficiently short range, the medium with the near-field light generated in the waveguide 10.

For control of a refractive index, improvement of adherence, prevention of a short-circuit in the light source 51, etc., another film can be provided between the light source 51 and the waveguide 10. Further, a protective film can be provided on the light exit surface of the waveguide 10.

The light source 51 does not have to be combined with the waveguide 10. In this case, another waveguide and/or an optical system such as a lens and a prism can be provided between the light source 51 and the waveguide 10. In this case, the light source 51 can be provided on a surface of the slider 52 except the surface on which the waveguide 10 is provided.

The recording head 50 can be provided so that the Y-axis direction (see FIG. 1 etc.) of the waveguide 10 may be parallel with or perpendicular to a track direction of the medium.

By passing an electric current through the waveguide 10, a magnetic field can be generated at substantially the same position of the near-field light, as described in Patent Literature 1. This makes it possible to realize an optically-assisted magnetic recording head which is highly efficient and easy to manufacture.

FIG. 13 is a diagram illustrating an arrangement of a recording head 56.

The recording head 56 is an optically-assisted magnetic recording head which generates a magnetic field to perform magnetic recording on a medium.

The recording head 56 is arranged such that a light source 51 is provided so as to protrude from a surface opposite to that surface of a slider 52 on which ABS is provided. On a side surface of the protruding light source 51, a reproducing element 54 is formed. Further, the waveguide 10 is provided on an end surface of the light source 51. In addition, a magnetic pole (magnetic field generation section) 53 is provided on a surface, of the waveguide 10, opposite to its surface on a reproducing element 54 side. That is, the reproducing element 54, the waveguide 10, and the magnetic pole 53 are provided in this order when viewed from the slider 52.

However, an order of the reproducing element 54, the waveguide 10, and the magnetic pole 53 is not limited to this, provided that a magnetic field and a distribution of heat due to the near-field light overlap each other on a medium.

The magnetic pole 53 is a member for generating a magnetic field in the vicinity of the light exit surface of the ends 16*d* and 18*d* where an inter-interface distance of the waveguide 10 is minimal therebetween.

In the recording head 56, light emitted from the light source 51 enters the waveguide 10 from a side of the first interface 16a and the second interface 18a. That is, the light source 51 emits light into the waveguide 10 from the minus direction of the Y-axis in FIG. 2 to the plus direction thereof.

The light incident surface of the waveguide 10 in the recording head 56 illustrated in FIG. 13 is a cross-section parallel with the X-Z plane.

According to the arrangement of the recording head 56, the magnetic pole 53 passes an electric current through the waveguide 10 so that a magnetic field may be generated at substantially the same position as the near-field light exited from the waveguide 10.

(Recording Device)

Figure 14:
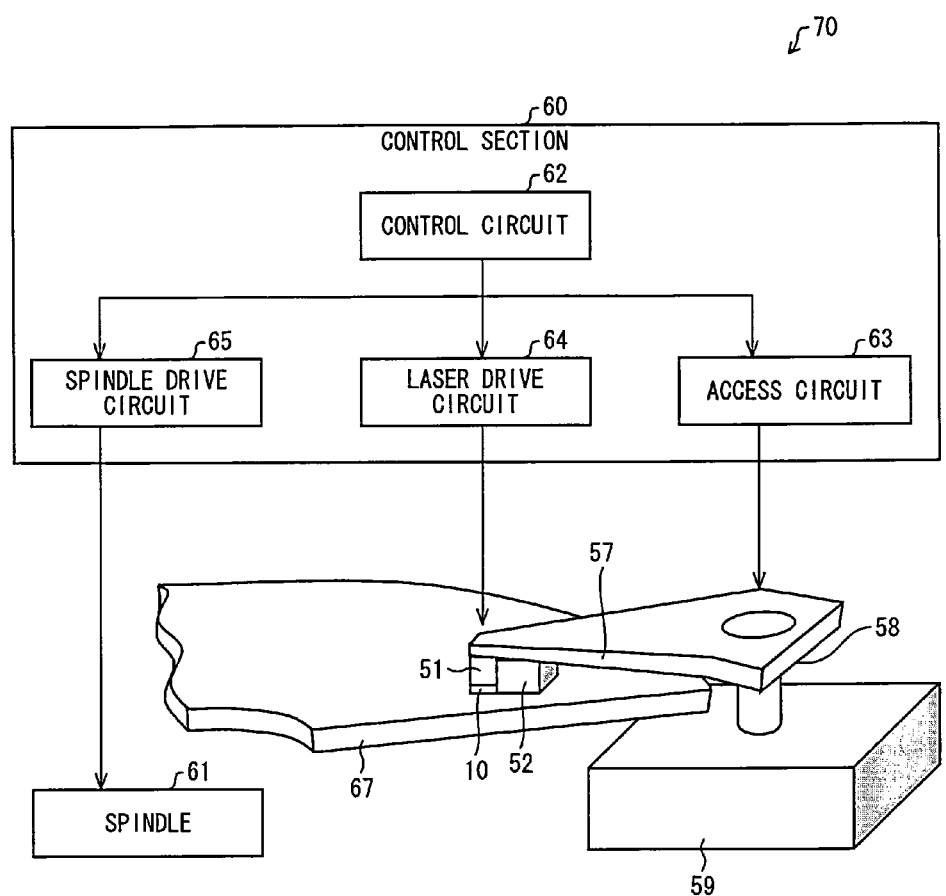
FIG. 14 is a perspective view illustrating a recording device using the recording head of the present invention.

With reference to FIG. 14, the following describes a recording device 70 for performing optical recording by using the recording head of the present embodiment. The aforementioned recording heads 50 and 56 are applicable to the recording device 70 of the present embodiment. The following deals with the recording device 70 using the recording heads 50 and 56.

FIG. 14 is a diagram illustrating an arrangement of the recording device 70 using the recording heads 50 and 56 of the present embodiment.

As illustrated in FIG. 14, the recording device 70 includes a spindle 61, a driving section 59, and a control section 60. The recording device 70 is a device for recording information on a recording medium 67 by use of at least light.

The spindle 61 corresponds to a spindle motor for rotating the recording medium 67.

The drive section 59 includes an arm 57, a rotary shaft 58, and a slider 52. The arm 57 is a member for moving the slider 52 in a substantial radial direction of the disk-shaped recording medium 67, and is a support for a swing-arm mechanism. The arm 57 is supported by the rotary shaft 58 so as to rotate around the rotary shaft 58. The slider 52 is a member for floating above the recording medium 67 at a predetermined distance. The recording head 50 or 56 is provided to the slider 52 so that the recording medium 67 is irradiated with an optical spot.

The control section 60 includes a control circuit 62, an access circuit 63, a recording circuit 64, and a spindle drive circuit 65. The access circuit 63 is a circuit for controlling a rotational position of the arm 57 of the drive section 59 so that the slider 52 may move to a target position on the recording medium 67. The recording circuit 64 is a circuit for controlling a light intensity and an irradiation time of the light source 51 of the recording head 50 or 56. The spindle drive circuit 65 is a circuit for controlling rotary drive of the recording medium 67. The control circuit 62 is a circuit for overall control of the access circuit 63, the recording circuit 64, and the spindle drive circuit 65.

The following describes how the recording device 70 operates, with reference to FIG. 14.

When the recording device 70 performs, on the recording medium 67, recording, reproduction, or whatnot of information, in other words, when the recording device 70 operates, the spindle drive circuit 65 in the control section 60 causes the spindle 61 to rotate at a proper number of rotations on which spindle 61 the recording medium 67 is mounted. The access circuit 63 in the control section 60 causes the drive section 59 to move so that the slider 52 may move to a target position on the recording medium 67.

The recording circuit 64 causes the light source 51 to emit light at a predetermined intensity and a predetermined time interval. Specifically, the recording circuit 64 causes the light source 51 to emit light so that the light may enter the waveguide 10. This generates a near-field light spot. As a result, the recording medium 67 is irradiated with the near-field light spot. In a case where a magnetic filed is utilized in addition to light, the recording circuit 64 controls an intensity and a time interval of the magnetic field so that the recording medium 67 is irradiated with the magnetic field. In this case, the light source 51 can perform time control in a similar way as the magnetic field, or keep emitting light.

Thus, optical spots are generated at intensities and time intervals in accordance with light emission of the light source 51. Accordingly, marks are recorded on the recording medium 67 by the optical spots. The control circuit 62 sums up the light emission of the light source 51, the operation of the drive section 59, and the rotation of the spindle 61 so as to issue instructions to each circuit, thereby allowing intended recording at a target position.

The recording medium 67 is an optical recording medium on which information is recorded by light, and is a phase-change medium. In this case, a recording layer of the recording medium 67 is heated by an optical spot so as to change from crystalline to amorphous. As a result, the heated recording layer is converted into a recorded mark. The recording medium 67 can be a magneto-optical recording medium on which information is recorded by light and a magnetic field. In this case, a recording layer of the recording medium 67 is heated by an optical spot. Simultaneously, a magnetic filed is applied to the recording layer. Accordingly, an orientation of a magnetic moment in the recording layer is reversed. As a result, the recording layer is converted into a recorded mark. According to the arrangement of the present invention, as described above, a magnetic field can be generated at substantially the same position as the near-field light spot in the vicinity of the ends 16d (18d), by passing an electric current through the waveguide 10. By changing a direction of the electric current to be passed through the waveguide 10, it is possible to change, upwards or downwards, a direction of the magnetic field to be applied to the recording medium 67.

A speed of formation of a recorded mark of the recording medium 67, i.e., a recording speed depends on a speed of temperature increase of the recording layer. The speed of temperature increase depends on a light intensity of an optical spot to be applied to the recording layer. That is, the higher the intensity of the optical spot, the shorter the time required for heating the recording medium 67 to a required temperature. This results in an increase in transfer rate.

Second Embodiment

The following describes a second embodiment of the present invention. In the following, a waveguide 80 of one embodiment of the present invention is described, with reference to FIGS. 18 through 20. The present embodiment deals with differences between the first embodiment and the present embodiment. For simplicity of explanation, members having the same functions as the members described in the first embodiment are given common reference signs, and descriptions for such members are not repeated.

(Arrangement of Waveguide)

First, the following describes an arrangement of the waveguide 80 of the present embodiment, with reference to FIG. 18.

FIG. 18 is a diagram illustrating a light incident surface of the waveguide 80.

In the case of the waveguide 10 of the first embodiment, a rate at which an inter-interface distance between the first interface 16a and the second interface 18a decreases in the plus direction of the Y-axis is higher than a rate at which an inter-interface distance between the first interface 16b and the second interface 18b decreases in the plus direction of the Y-axis.

By contrast, in the case of the waveguide 80 of the present embodiment, a rate at which an inter-interface distance between the first interface 16a and the second interface 18a decreases in the plus direction of the Y-axis is lower than a rate at which an inter-interface distance between the first interface 16b and the second interface 18b decreases in the plus direction of the Y-axis. That is, in the case of the waveguide 80, a rate of change of an inter-interface distance between the first interface 16a and the second interface 18a in the first area 13 is lower than a rate of change of an inter-interface distance between the first interface 16b and the second interface 18b in the second area 14. Accordingly, the first vertex angle θ1 is smaller than the second vertex angle θ2.

(Near-Field Light)

The following shows that an increased intensity of near-field light can also be obtained by providing the flections P16 and P18 to the waveguide 80 of the present embodiment. The following describes near-field light to be generated by the waveguide 80 of the present embodiment, with reference to FIGS. 19 and 20 which show simulation results obtained by the FDTD method.

In the simulation, the waveguide 80 was arranged such that: a material of the metallic member 11 was gold; a material of the dielectric member 12 was air; the first vertex angle θ1 was 5°; and the second vertex angle θ2 was 10°. The position Y0 was located at 1000 (nm) from the origin point in the minus direction of the Y-axis. A film thickness of the waveguide 80 was 500 nm.

The incident light was a laser whose wavelength was 780 nm and whose intensities form a Gaussian distribution. The laser has an intensity of $1/e^2$ in a case where the laser has radiation angles of 10° in the X-direction and 20° in the Y-direction as one example of radiation angles of a semiconductor laser. In simulation of the incident light, a center of intensities of the incident light was set to the position of the end 16d (18d) on the light incident surface. A polarization direction of the incident light was the X-direction.

FIG. 19 is a graph showing intensity distributions, with respect to distances parallel with the Y-direction, of surface plasmon polaritons on light exit surfaces (X-Y planes) of waveguides. In FIG. 19, the continuous line (flections are provided) indicates a result of the waveguide 80 of the present embodiment; the dashed line (no flection is provided) indicates a result of a waveguide (not illustrated) whose θ1 and θ2 are both 10° (i.e., a waveguide which is the same as the waveguide 80 except that the first interface 16 and the second interface 18 are flat surfaces).

FIG. 19 shows that the waveguide 80 (flections are provided) including the first area 13 and the second area 14 makes it possible to obtain a higher intensity, as compared to the waveguide which does not include the flections P16 and P18.

Therefore, even if θ1 is smaller than θ2, it is possible to reduce a film thickness of a waveguide thin enough to the extent that ease of manufacture thereof is not impaired and to efficiently convert incident light into near-field light which forms a small spot, by arranging the waveguide so that, as is the case with the waveguide 80 of the present embodiment, the first interface 16 of the metallic member 11 against the dielectric member 12 includes the first interface 16a and the first interface 16b provided so as to form a flection in combination with the first interface 16a while the second interface 18 of the metallic member 11 against the dielectric member 12 includes the second interface 18a and the second interface 18b provided so as to form a flection in combination with the first interface 18a.

FIG. 19 shows results obtained in a case where a film thickness of the waveguide 80 was 500 nm. However, even if the waveguide 80 is used as a waveguide (optical waveguide) such as those disclosed in Patent Literatures 2 and 3, a strong intensity can be obtained on the light exit surface of the waveguide 80 by adjusting structural parameters such as Y0, θ1, and θ2. This indicates that independently of a length (distance parallel with the Z-direction) of a waveguide, the arrangement is preferable in which the first interface 16 of the metallic member 11 against the dielectric member 12 includes the first interface 16a and the first interface 16b provided so as to form a flection in combination with the first interface 16a while the second interface 18 of the metallic member 11 against the dielectric member 12 includes the second interface 18a and the second interface 18b provided so as to form a flection in combination with the second interface 18a.

As illustrated in FIG. 18, in the waveguide 80, a rate at which an inter-interface distance between the first interface 16 and the second interface 18 decreases from the ends 16c and 18c toward the ends 16d and 18d does not change at positions except the positions of the flections P16 and P18. In other words, in the X-Y cross-section of the waveguide 80, the first interfaces 16a and 16b, and the second interfaces 18a and 18b are expressed by straight lines. That is, the X-Y cross-section of the waveguide 80 can be described as two stacked V-shaped angles.

According to the arrangement of the waveguide 80, in the first area 13 where an inter-interface distance is longer than that of the second area 14, a rate of change of an inter-interface distance is lower than in the second area 14. Therefore, also in the first area 13, it is possible to secure a wide area where an inter-interface distance is not longer than a wavelength of incident light. This makes it possible to eliminate that area in the first area 13 in which incident light passes through as it is, or to reduce such an area and keep the area away from an area where the near-field light is generated. Therefore, the arrangement of the waveguide 80 makes it possible to eliminate background noise of obtained near-field light, or to reduce an effect of the background noise.

However, as described above, the first interface 16 and the second interface 18 of the waveguide 80 which are interfaces of the metallic member 11 against the dielectric member 12 can be freely arranged, provided that surface plasmon polaritons are reflected at the flections P16 and P18 or within the first interface 16a and the second interface 18a.

FIG. 20 is a diagram showing an intensity distribution of near-field light on the light exit surface of the waveguide 80 of the present embodiment. As shown in FIG. 20, the near-field light spot is a minute near-field light spot having a diameter of not more than 50 nm.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

A waveguide of the present invention is a waveguide for converting incident light into near-field light, consisting of a metallic member and a dielectric member sandwiched by the metallic member. A cross-section of the waveguide includes an area where an inter-metallic member distance decreases which is a distance between surfaces of the metallic member sandwiching the dielectric member. A rate at which the inter-metallic member distance decreases has an inflection point.

According to the arrangement, surface plasmon polaritons are reflected at the inflection point, thereby returning to an area where the inter-metallic member distance is shorter. This increases an intensity of a micro near-field light spot to be generated in the vicinity of a position where the inter-metallic member distance is minimal. That is, incident light can be efficiently converted into near-field light whose spot size is small.

The waveguide of the present invention is further arranged such that in the area where the inter-metallic member distance decreases, a rate at which the inter-metallic member distance decreases is higher in an area where the inter-metallic member distance is longer than the inter-metallic member distance at the inflection point, than in an area where the inter-metallic member distance is shorter than the inter-metallic member distance at the inflection point.

According to the arrangement, surface plasmon polaritons are reflected at the inflection point and in the area where the inter-metallic member distance is longer than the inter-metallic member distance at the inflection point, thereby returning to an area where the inter-metallic member distance is shorter. This increases an intensity of a micro near-field light spot to be generated in the vicinity of a position where the inter-metallic member distance is minimal. That is, incident light can be efficiently converted into near-field light whose spot size is small.

The waveguide of the present invention is arranged such that in the cross-section, the inter-metallic member distance decreases so that the surfaces of the metallic member sandwiching the dielectric member may be finally connected with each other.

According to the arrangement, a size of a near-field light spot to be formed in the vicinity of the position where the inter-metallic member distance is minimal varies depending on the inter-metallic member distance. As a result, it is possible to reduce a size of the near-field light spot.

The waveguide of the present invention is further arranged such that in the cross-section, a boundary between the dielectric member and the metallic member forms a straight line in the area where the inter-metallic member distance decreases, except for the inflection point.

According to the arrangement, an electric field component of surface plasmon polaritons acting between the surfaces of the metallic member is always oriented in a constant direction. This decreases a loss of the surface plasmon polaritons propagating along the boundary between the dielectric member and the metallic member. As a result, this increases an intensity of a near-field light spot to be obtained. That is, incident light can be efficiently converted into near-field light whose spot size is small.

The waveguide of the present invention is further arranged such that in the area where the inter-metallic member distance decreases, a direction in which the inter-metallic member distance decreases does not change.

According to the arrangement, an electric field component of the surface plasmon polaritons acting between the surfaces of the metallic member is always oriented in a constant direction. This decreases a loss of the surface plasmon polaritons propagating along the boundary between the dielectric member and the metallic member. As a result, this increases an intensity of a near-field light spot to be obtained. That is, incident light can be efficiently converted into near-field light whose spot size is small.

The waveguide of the present invention is further arranged such that any one of gold, silver, copper, platinum, chrome, and aluminum is selected as a main component of a material of the metallic member.

The arrangement increases an excitation intensity of the surface plasmon polaritons propagating along the boundary between the dielectric member and the metallic member. As a result, this increases a light intensity of a near-field light spot to be obtained. That is, incident light can be efficiently converted into near-field light whose spot size is small.

The waveguide of the present invention is further arranged such that the area where the inter-metallic member distance decreases is irradiated with incident light whose polarization direction is perpendicular to at least one of directions in which the inter-metallic member distance decreases in this irradiated area.

The arrangement increases an excitation intensity of the surface plasmon polaritons propagating along the boundary between the dielectric member and the metallic member. As a result, this increases an intensity of a near-field light spot to be obtained. That is, incident light can be efficiently converted into near-field light whose spot size is small.

A recording head of the present invention includes at least a light source and any one of the waveguides.

The arrangement makes it possible to converge light emitted from the light source in the vicinity of the position where the inter-metallic member distance is minimal. This makes it possible to obtain a high-intensity near-field light spot. As a result, this makes it possible to record a mark of a high S/N ratio.

The recording head of the present invention is further arranged such that the light source and the waveguide are integrated as one unit.

According to the arrangement, a small recording head can be realized. In addition, there provided no unnecessary optical system. This decreases a possibility of a temporal change such as a misalignment of an optical axis. In addition, this makes it possible to suppress manufacturing costs of the recording head.

The recording head of the present invention is further arranged such that the recording head passes an electric current through the metallic member of the waveguide so that a magnetic field may be generated at a position where the inter-metallic member distance is minimal.

The arrangement makes it possible to generate near-field light and a magnetic field in the vicinity of the position where the inter-metallic member distance is minimal. This makes it possible to record a small mark by optically-assisted magnetic recording. As a result, a high-density recording can be realized.

A recording device of the present invention includes any one of the recording heads.

The arrangement makes it possible to realize: a recording device capable of recording a mark of a high S/N ratio; a small low-cost recording device having a small temporal change; or high-density optically-assisted magnetic recording.

As described above, a waveguide of the present invention is a waveguide for converting incident light into near-field light, including a metallic member and a dielectric member sandwiched by the metallic member. A cross-section of the waveguide includes an area where an inter-metallic member distance decreases which is a distance between surfaces of the metallic member sandwiching the dielectric member. A rate at which the inter-metallic member distance decreases has an inflection point.

The arrangement makes it possible to efficiently convert incident light into near-field light whose spot size is small. In addition, the arrangement makes it possible to provide a waveguide which has a sufficiently thin film thickness and which is easy to manufacture, even if the waveguide is formed right after a laser.

As described above, a waveguide of the present invention is a waveguide for converting incident light into near-field light, including: a metallic member made of a metallic material; and a dielectric member made of a dielectric material, the metallic member sandwiching the dielectric member in such a manner that a first interface and a second interface between the metallic member and the dielectric member are disposed to have a shorter inter-interface distance therebetween toward first ends from second ends thereof, and at least one of the first interface and the second interface including a flection.

According to the arrangement, the metallic member includes the first interface and the second interface so as to sandwich the dielectric member. This makes it possible to convert, by the first interface and the second interface, light incident on the metallic member into surface plasmon polaritons.

An effective refractive index of the surface plasmon polaritons is low in an area where the inter-interface distance is long while the effective refractive index of the surface plasmon polaritons is high in an area where the inter-interface distance is short. The surface plasmon polaritons propagating along the first interface and the second interface change their propagation direction to a direction in which the effective refractive index is increased.

According to the arrangement, the first interface and the second interface are provided so that the inter-interface distance therebetween may be decreased from the first ends to the second ends. As a result, the propagation direction of the surface plasmon polaritons can be changed so that the inter-interface distance may be decreased.

The arrangement in which the first interface and the second interface are provided so that the inter-interface distance therebetween may be decreased from the first ends to the second ends makes it possible to converge more, at the second ends, the surface plasmon polaritons propagating along the first interface and second interface, as compared to a case where the first interface and the second interface are provided parallel with each other. This makes it possible to increase an intensity of near-field light which exits from the metallic member, and to reduce a spot size of the near-field light.

Further, according to the arrangement, at least one of the first interface and the second interface includes a flection. As a result, the surface plasmon polaritons propagating along the first interface or the second interface can be reflected by the flection so that the propagation direction may be changed. This makes it possible to converge more, at the second ends, the surface plasmon polaritons propagating along the first interface and the second interface, as compared to a case where neither the first interface nor the second interface includes the flection. This makes it possible to increase an intensity of the near-field light which exits from the metallic member, and to reduce the spot size. As a result, the intensity can be increased. Further, this makes it possible to reduce a thickness of a waveguide.

As described above, the arrangement makes it possible to efficiently convert incident light into near-field light whose spot size is small.

Further, the waveguide of the present invention preferably includes a first area and a second area each encompassing (i) a part of the metallic member sandwiching a part of the dielectric member and (ii) the part of the dielectric member, the first area being bordered from the second area in reference to the flection, and the inter-interface distance being shorter in the second area than in the first area.

According to the arrangement, the inter-interface distance is shorter in the second area than in the first area. Therefore, an effective refractive index is higher in the second area than in the first area. This makes it possible to change the propagation direction of the surface plasmon polaritons propagating along the first interface and the second interface in the first area, to a direction in which the second area is provided. This makes it possible to converge the surface plasmon polaritons on the first interface and the second interface in the second area. This makes it possible to increase an intensity of the near-field light which exits from the waveguide.

Further, the waveguide of the present invention is preferably arranged such that the inter-interface distance takes a maximal value between the first ends while the inter-interface distance takes a minimal value between the second ends.

According to the arrangement, the inter-interface distance takes a maximal value between the first ends while the inter-interface distance takes a minimal value between the second ends. This makes it possible to change, to a direction toward the second ends, the propagation direction of the surface plasmon polaritons propagating along the first interface and the second interface. This makes it possible to converge the surface plasmon polaritons at the second ends. This makes it possible to increase an intensity of the near-field light which exits from the waveguide, and to reduce the spot size.

Further, the waveguide of the present invention is preferably arranged such that a rate of change of the inter-interface distance between the first interface and the second interface changes at the flection.

The arrangement makes it possible to form the flection on at least one of the first interface and the second interface. This makes it possible to reflect, by the flection, the surface plasmon polaritons propagating along the first interface and the second interface. As a result, this makes it possible to efficiently convert incident light into near-field light whose spot size is small.

Further, the waveguide of the present invention is preferably arranged such that a rate of change of the inter-interface distance in the first area is higher than a rate of change of the inter-interface distance in the second area.

According to the arrangement, a rate of change of an effective refractive index of the surface plasmon polaritons on the first interface and the second interface in the first area is higher than a rate of change of an effective refractive index of the surface plasmon polaritons on the first interface and the second interface in the second area.

Accordingly, among the surface plasmon polaritons propagating along the first interface and the second interface in the second area where the rate of change is low, some surface plasmon polaritons which have reached the first interface and the second interface in the first area where the rate of change is high change their propagation direction (i.e., are reflected) due to a large rate of change of the effective refractive index of the first interface and the second interface in the first area.

This makes it possible to return, to the first interface and the second interface in the second area, the surface plasmon polaritons which have reached the first interface and the second interface in the first area across the flection from the first interface and the second interface in the second area. This makes it possible to increase an intensity of the near-field light which exits from the waveguide.

Further, the waveguide of the present invention is preferably arranged such that a rate of change of the inter-interface distance in the first area is lower than a rate of change of the inter-interface distance in the second area.

According to the arrangement, the rate of change is lower, than in the second area, in the first area where an inter-interface distance is longer than that of the second area. This makes it possible to secure, in the first area, a wide area where an inter-interface distance is not longer than a wavelength of the incident light. This makes it possible to eliminate that area in the first area in which the incident light passes through as it is, or to reduce such an area and keep the area away from an area where the near-field light is generated. Therefore, it is possible to eliminate background noise of obtained near-field light, or to reduce an effect of the background noise.

Further, the waveguide of the present invention is preferably arranged such that the first interface and the second interface are provided so that an angle formed therebetween at the second ends is an acute angle.

This makes it possible to reduce a spot size of the near-field light which exits from the second ends.

Further, the waveguide of the present invention is preferably arranged such that the first interface and the second interface have contact with each other at the second ends.

A spot size of the near-field light which exits from the waveguide varies depending on an inter-interface distance. Therefore, the arrangement makes it possible to reduce a spot size of the near-field light which exits from the waveguide.

Further, the waveguide of the present invention is preferably arranged such that the first interface has two flat surfaces, one of which is in the first area and the other of which is in the second area, and the second interface has two flat surfaces, one of which is in the first area and the other of which in the second area, and the flat surfaces incline to each other.

In a case where a surface along which the surface plasmon polaritons propagate is a curved surface, the surface plasmon polaritons are required to change their propagation direction in accordance with the curved surface. If the propagation direction is changed, there occur diffusion, reflection, etc. of the surface plasmon polaritons. This leads to a loss of surface plasmon polaritons.

By contrast, according to the arrangement, surface plasmon polaritons propagating along a flat surface are not required to change their propagation direction. Therefore, it is possible to prevent the loss of the surface plasmon polaritons due to diffusion, reflection, etc. This makes it possible to increase an intensity of the near-field light to be obtained on the light exit surface of the waveguide. In other words, this makes it possible to efficiently convert the incident light into near-field light whose spot size is small.

Further, the waveguide of the present invention is preferably arranged such that the first interface has two curved surfaces, one of which is in the first area and the other of which is in the second area, and the second interface has two curved surfaces, one of which is in the first area and the other of which in the second area.

The arrangement makes it possible to increase a rate of change of an inter-interface distance which changes from the first ends to the second ends, as compared to a case where the first interface and the second interface are flat surfaces. This makes it possible to further increase a rate of change of the propagation direction of the surface plasmon polaritons propagating along the first interface and the second interface. This makes it possible to converge the surface plasmon polaritons more at the second ends. This makes it possible to increase an intensity of the near-field light to be obtained on the light exit surface of the waveguide. In other words, it is possible to efficiently convert the incident light into near-field light whose spot size is small.

Further, the waveguide of the present invention is preferably arranged such that the first interface and the second interface each have the flection; and the first interface and the second interface are symmetrical with each other.

According to the arrangement, an electric field component of the surface plasmon polaritons acting between the first interface and the second interface is always oriented in a constant direction. This decreases a loss of the surface plasmon polaritons propagating along the first interface and the second interface. As a result, this increases an intensity of near-field light to be obtained. That is, incident light can be efficiently converted into near-field light whose spot size is small.

Further, the waveguide of the present invention is preferably arranged such that the metallic material of the metallic member contains, as its main component, one selected from the group consisting of gold, silver, copper, platinum, chrome, and aluminum.

The arrangement makes it possible to increase an excitation intensity of the surface plasmon polaritons propagating along the first interface and the second interface. As a result, this increases an intensity of the near-field light which exits from the waveguide. That is, the incident light can be efficiently converted into near-field light whose spot size is small.

A recording head of the present invention preferably includes any one of the waveguides; and a light source for emitting linearly-polarized light into the waveguide.

According to the arrangement, the linearly-polarized light emitted from the light source is used as the incident light into the waveguide so that surface plasmon polaritons propagate along the first interface and the second interface. As a result, it is possible to obtain high-intensity near-field light. This makes it possible to realize a recording head which can record a mark of a high S/N ratio in a case where, e.g., a recording medium is irradiated with the near-field light.

Further, the recording head of the present invention is preferably arranged such that the light source emits the linearly-polarized light into the waveguide in such a manner that the linearly-polarized light reaches an area where the second ends are provided; and a polarization direction of the linearly-polarized light includes at least a polarization direction perpendicular to a straight line connecting midpoints between a part of the first interface and a part of second interface in the first area or the second area in a cross-section perpendicular to the first interface and the second interface.

The arrangement increases an excitation intensity of the surface plasmon polaritons propagating along the first interface and the second interface. As a result, this increases an intensity of the near-field light to be obtained. That is, the incident light can be efficiently converted into near-field light whose spot size is small.

Further, the recording head of the present invention is preferably arranged such that the light source and the waveguide are integrated as one unit.

According to the arrangement, a small recording head can be realized. In addition, there provided no unnecessary optical system. This decreases a possibility of a temporal change such as a misalignment of an optical axis. In addition, this makes it possible to suppress manufacturing costs of the recording head.

Further, the recording head of the present invention preferably further includes a magnetic field generation section for passing an electric current through the metallic member in the waveguide so as to generate an magnetic field in the vicinity of a light exit surface of the waveguide between the second ends.

The arrangement makes it possible to generate the near-field light and a magnetic field in the vicinity of the light exit surface of the waveguide between the second ends. By placing, e.g., a medium on a light exit surface side of the waveguide, the arrangement makes it possible to perform magnetic recording on the medium. In addition, the waveguide makes it possible to reduce a spot size of the near-field light. This allows a reduction of a size of the magnetic field to be recorded on the medium. As a result, the arrangement makes it possible to realize a recording head capable of high-density magnetic recording.

A recording device of the present embodiment preferably includes the recording head.

The arrangement makes it possible to realize: a recording device capable of recording a mark of a high S/N ratio on a medium loaded in the recording device; a small low-cost recording device having a small temporal change; or a recording device capable of high-density optically-assisted magnetic recording.

INDUSTRIAL APPLICABILITY

The present invention is suitably applicable to a recording device for performing optical recording on a recording medium.

REFERENCE SIGNS LIST 10, 10b, 20, 30, 40, and 80 Waveguide
11 Metallic member
12 Dielectric member
13 First area
14 Second area
16 First interface
16c End (on one side)
16d End (on the other side)
18 Second interface
18c End
18d End
50 and 56 Recording head
51 Light source
53 Magnetic Pole (magnetic field generation section)

The invention claimed is:

1. A waveguide for converting incident light into near-field light, comprising:
a metallic member made of a metallic material; and
a dielectric member made of a dielectric material,
the metallic member sandwiching the dielectric member in such a manner that a first interface and a second interface between the metallic member and the dielectric member are disposed to have a shorter inter-interface distance therebetween toward first ends from second ends thereof,
the first ends and the second ends being sandwiched between two planes so that locations of the two planes, with respect to each other, are defined,
one of the two planes serving as a light incident surface on which the incident light is incident,
the other one of the two planes serving as a light exit surface from which the incident light is emitted, and
at least one of the first interface and the second interface including a flection so as to change a rate of a change of the inter-interface distance.

2. The waveguide as set forth in claim 1, further comprising a first area and a second area each encompassing (i) a part of the metallic member sandwiching a part of the dielectric member and (ii) a part of the dielectric member, the first area being bordered from the second area in reference to the flection, and the inter-interface distance being shorter in the second area than in the first area.

3. The waveguide as set forth in claim 1, wherein
the inter-interface distance takes a maximal value between the first ends while the inter-interface distance takes a minimal value between the second ends.

4. The waveguide as set forth in claim 1, wherein
a rate of change of the inter-interface distance between the first interface and the second interface changes at the flection.

5. The waveguide as set forth in claim 2, wherein
a rate of change of the inter-interface distance in the first area is higher than a rate of change of the inter-interface distance in the second area.

6. The waveguide as set forth in claim 2, wherein
a rate of change of the inter-interface distance in the first area is lower than a rate of change of the inter-interface distance in the second area.

7. The waveguide as set forth in claim 3, wherein
the first interface and the second interface are disposed so that an angle formed therebetween at the second ends is an acute angle.

8. The waveguide as set forth in claim 3, wherein
the first interface and the second interface have contact with each other at the second ends.

9. The waveguide as set forth in claim 2, wherein
the first interface has two flat surfaces, one of which is in the first area and the other of which is in the second area, and the second interface has two flat surfaces, one of which is in the first area and the other of which is in the second area, and the flat surfaces incline to each other.

10. The waveguide as set forth in claim 2, wherein
the first interface has two curved surfaces, one of which is in the first area and the other of which is in the second area, and the second interface has two curved surfaces, one of which is in the first area and the other of which is in the second area.

11. The waveguide as set forth in claim 1, wherein:
the first interface and the second interface each have the flection; and
the first interface and the second interface are symmetrical with each other.

12. The waveguide as set forth in claim 1, wherein
the metallic material of the metallic member contains, as its main component, one selected from the group consisting of gold, silver, copper, platinum, chrome, and aluminum.

13. A recording head comprising:
a waveguide recited in claim 2; and
a light source for emitting linearly-polarized light into the waveguide.

14. The recording head as set forth in claim 13, wherein:
the light source emits linearly-polarized light into the waveguide in such a manner that the linearly-polarized light reaches an area where the second ends are provided; and
a polarization direction of the linearly-polarized light includes at least a polarization direction perpendicular to a straight line connecting midpoints between a part of the first interface and a part of the second interface in the first area or the second area in a cross-section perpendicular to the first interface and the second interface.

15. The recording head as set forth in claim 13, wherein the light source and the waveguide are integrated as one unit.

16. The recording head as set forth in claim 12, further comprising a magnetic field generation section for passing an electric current through the metallic member in the waveguide so as to generate a magnetic field in the vicinity of a light exit surface of the waveguide between the second ends.

17. A recording device comprising a recording recited in claim 13.

* * * * *